(12) United States Patent
Peters

(10) Patent No.: US 7,080,586 B2
(45) Date of Patent: Jul. 25, 2006

(54) TRIPLE ACTION CAM DIE SET FOR CUTTING THE ENDS OF METAL TUBES

(75) Inventor: Michael Wayne Peters, White Lake, MI (US)

(73) Assignee: Trim Trends Co., LLC, Farmington Hills, MI (US)

( * ) Notice: Subject to any disclaimer, the term of this patent is extended or adjusted under 35 U.S.C. 154(b) by 184 days.

(21) Appl. No.: 10/742,090

(22) Filed: Dec. 19, 2003

(65) Prior Publication Data

US 2005/0132857 A1      Jun. 23, 2005

(51) Int. Cl.
   *B26D 1/04*      (2006.01)
(52) U.S. Cl. .............................. 83/378; 83/54; 83/635
(58) Field of Classification Search .................. 83/300, 83/622, 375–390, 519, 54, 56, 185, 627, 83/914, 916, 917, 246, 355, 638, 411.2, 411.3, 83/635, 588, 601, 620, 554–560; 100/291; 72/315, 452.9
   See application file for complete search history.

(56) References Cited

U.S. PATENT DOCUMENTS

| | | | |
|---|---|---|---|
| 1,169,209 A | 1/1916 | True et al. | |
| 3,153,360 A * | 10/1964 | Couldon ...................... | 83/191 |
| 3,566,651 A | 3/1971 | Tlaker | |
| 3,911,768 A | 10/1975 | Kawano | |
| 3,955,453 A | 5/1976 | Carmichael et al. | |
| 4,036,091 A * | 7/1977 | Borzym ........................ | 83/319 |
| 4,043,015 A | 8/1977 | Hickman et al. | |
| 4,123,189 A | 10/1978 | Ferlise et al. | |
| 4,205,569 A | 6/1980 | Horn et al. | |
| 4,233,726 A | 11/1980 | Williams | |
| 4,580,657 A | 4/1986 | Schmeichel et al. | |
| 4,631,998 A | 12/1986 | Borzym | |
| 4,847,963 A | 7/1989 | Bendoraitas et al. | |
| 4,848,723 A * | 7/1989 | Borzym ...................... | 269/157 |
| 5,016,460 A | 5/1991 | England et al. | |
| 5,383,381 A * | 1/1995 | Graham ........................ | 83/385 |
| 5,893,315 A * | 4/1999 | Miller ........................... | 83/320 |
| 6,058,605 A | 5/2000 | Binder et al. | |
| 6,240,820 B1 | 6/2001 | Sturrus et al. | |
| 6,295,906 B1 | 10/2001 | Kiger | |
| 2001/0008096 A1 | 7/2001 | Sturrus et al. | |

* cited by examiner

*Primary Examiner*—Kenneth E. Peterson
*Assistant Examiner*—Phong Nguyen
(74) *Attorney, Agent, or Firm*—Dykema Gossett PLLC

(57) ABSTRACT

The triple action cam die set has an upper die, lower die and a cam system that works on multiple axes. A feeder delivers tubes sequentially to a loading station from where the tube is moved to a work station where the ends of the tube are cut and then the cut tube is moved to an exit station. The upper die has pairs of first, second and third drivers, each driver having a caming surface thereon. The lower die has a pair of cutter holders with cutters located opposite the ends of the tube when located at the work station. The cutter holders have first, second and third cam surfaces thereon which are sequentially engageable by the cam surfaces provide on the first, second and third drivers when the upper die is cycled.

76 Claims, 21 Drawing Sheets

TRIPLE ACTION CAM DIE SET FOR CUTTING THE ENDS OF METAL TUBES

BACKGROUND OF THE INVENTION

In the prior art it has been difficult to cut the ends of metal tubes or tubular work pieces to form scallops on the ends which will fit within close tolerances round or cylindrical objects. The present invention has overcome the lack of acceptance tolerances in metal tubes when ends are cut by providing a triple action cam cutting tool or die set which operates on each end of the tubular work piece or tube simultaneously by cutting first one side at each end of the tube and then cutting the other side at each end of the tube thereby achieving acceptable tolerances which are virtually identical between both ends of the tube.

SUMMARY OF THE INVENTION

The triple action cam die set or tool has an upper die and a lower die which are mounted, as an example, in a press, with the upper die being attached to the moveable platen of the press and the lower die being mounted on the base of the press. Incorporated in the die set is a unique triple action cam system that works on multiple axes. The die set has a hopper, magazine or feeder where tubes are delivered sequentially, one by one, to a loading station from where the tube is moved to a work station, where the ends of the tube are cut, and then the tube is moved to an exit station. The upper die set has pairs of first, second and third cam drivers, each driver having caming surfaces thereon. The die set includes on the lower die a pair of cutter holders with cutters located opposite the ends of the tube when located at the work station. The cutter holders each has first, second and third cam surfaces thereon which are sequentially engageable by the cam surfaces provided on the first, second and third cam drivers.

When the upper die is cycled and moved in a downward stroke direction, the upper die comes into engagement with the lower die. As a result thereof, the first cam drivers engage the first cam surfaces provided on the cutter holders and thereby move the cutter holders towards the ends of the tube at the work station. At such time the cutters enter the ends of the tube and the tube is held by clamps in a fixed position. As the downward stroke of the upper die continues, the second cam surfaces of the second cam drivers engage the second cam surfaces of the cutter holders to drive the holders to cut at one side from top to bottom and thereby form one side on each of the ends of the tube. As the down stroke of the upper die continues, the cam surfaces on the third cam drivers engage the third cam surfaces of the cutter holders to drive each holder in the opposite direction to cut from top to bottom and thereby form the other side on each of the ends of the tube.

Thereafter the cam surfaces provided on the second cam drivers during the upstroke of the upper die reengages the second cam surfaces of the cutter holders to drive each holder in a direction without cutting the tube until the second cam drivers clear the second cam surfaces of the cutter holders. Once the upper die has cleared the lower die, means are provided for centering the cutter holders before the start of the next downward stroke of the upper die. Once the ends of the tube have been scalloped or formed, the clamps are released and another tube is moved into the work station from the loading station and the finished tube is moved to the exit station.

The multiple action cam die set include a slide system inside the tool which uses springs such as gas springs to hold certain components on center and then when the slide system is operated by the first cam drivers the tube from the loading station is advanced to the work station where second and third cam drivers are provided at each side of the tube which trigger a back and forth action of the cams. The invention further includes positive returns and stops so that as each action is happening, the cutter holders will wind up on center again when the holders return. Thus, the cam system moves forward, side-to-side and then back to center and retracts. It performs such functions during each complete stroke or cycle of the die set. Each cycle of the press results in one cut tube.

Thus, with the present invention, when the die set closes, the upper die goes over the top of the tube that has been presented to it at the work station. Simultaneously cutting blades are inserted into the inside diameter of the tube at each end. Once the cutting blades are inserted inside the tube ends, the die set continues to close. The second and third caming surfaces on the cutter holders are driven respectively by the second and third cam drivers, first in a forward direction, then a rearward direction and then back to center to do the actual cutting. When the press is returned, it also triggers a switch in the tool that advances the cut tube to an exit location or station and at the same time, it brings an uncut tube from the loading station to the work station.

DETAILED DESCRIPTION OF THE PREFERRED EMBODIMENT

Figure 1:
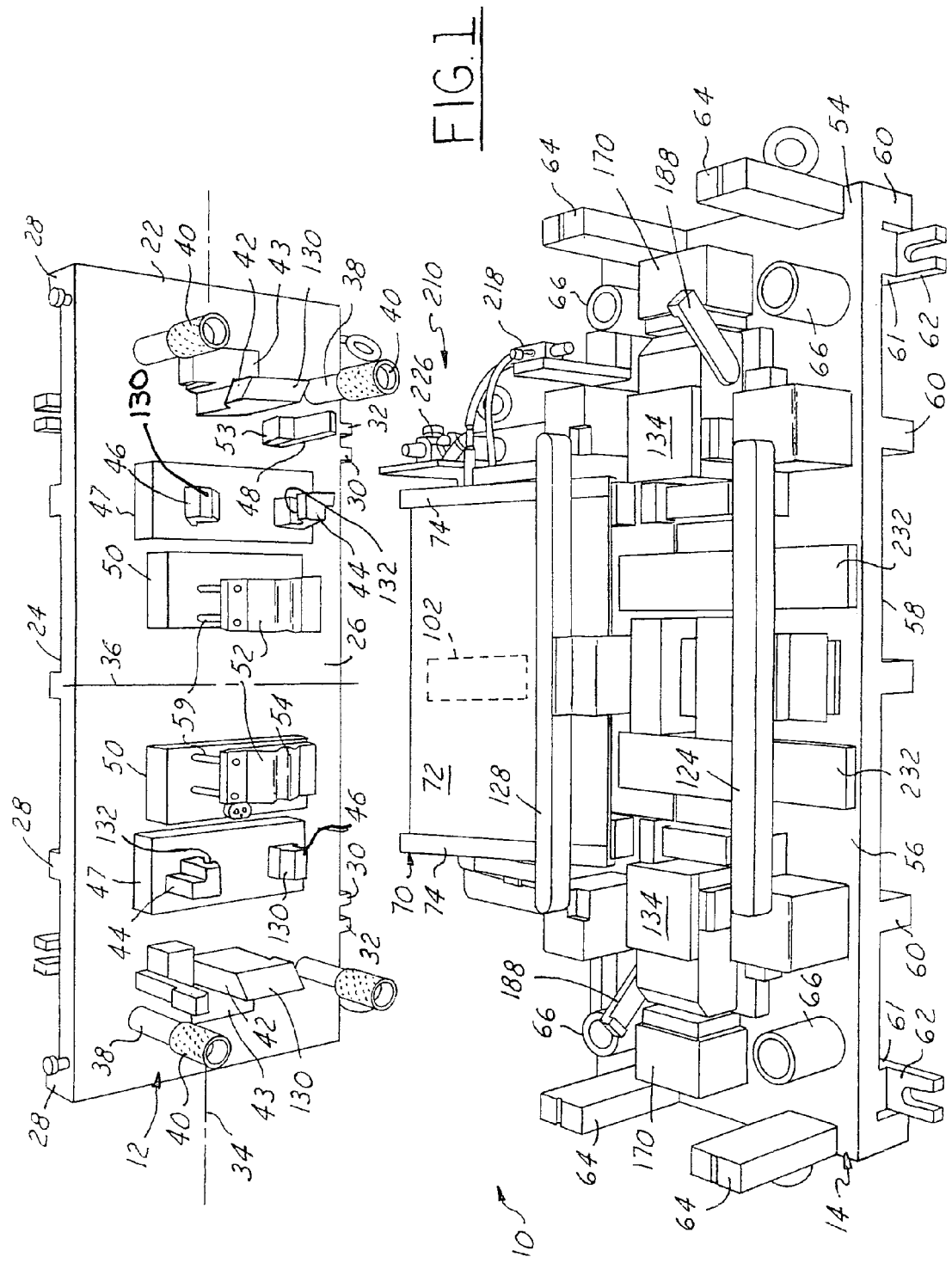
FIG. 1 is a pictorial view of the die set, with the upper die being spaced from the lower die and with certain parts removed for clarity purposes.
Figure 3:
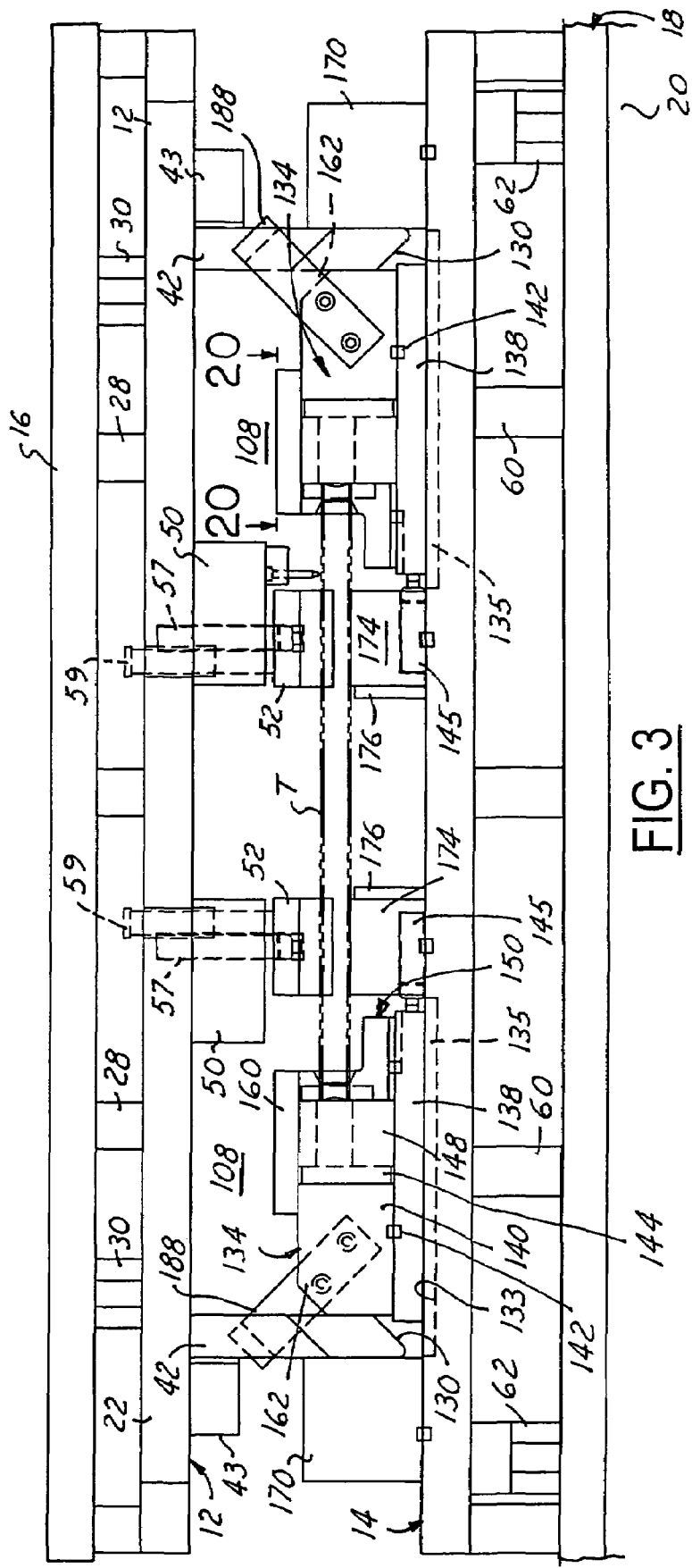
FIG. 3 is an elevational view of the die set in a closed position taken along the longitudinal center line through the work stations.

The present invention relates to a triple action cam die, tool or die set 10 for cutting, trimming or forming scallops on the ends of metal tubes. The tool or die set 10 has an upper die 12 and a lower die 14 as illustrated in FIG. 1. The upper die 12 is mounted on the movable platen 16 of a press 18 while the lower die 14 is fixedly secured to the base 20 of the press 18 as schematically represented in FIG. 3 and elsewhere throughout the drawings. The tool 10 includes a tube feeder or magazine 70 mounted on the lower die 14 which may be manually or automatically loaded with tubes which are then directed sequentially into the interior of the die set 10 upon the cycling of the press 18 where work is performed on the ends of the tubes. The press 18 has certain controls, not shown, for automatically cycling same to raise and lower the platen 16 and therefore the upper die 12 in a timely fashion. The press 18 may include controls which are operated by the die set 10 after the ends of the tubes have been cut or formed. Heretofore it has been difficult to cut identical scallops on a tube. With the present invention, the ends of each tube are simultaneously rounded or scalloped on one side and then on the other side. By cycling the press 18, the ends of the tube are automatically cut or scalloped, with four pieces of scrap metal removed, two pieces of metal at each end, to provide a clean or smooth edge section on each side with virtually identical tolerances on each end of the tube.

The upper die 12 is made from a relatively thick steel plate or die shoe 22 of generally rectangular configuration having an upper surface 24 and a working surface 26. The upper surface 24 is reinforced and provided with a plurality of transversely extending longitudinally spaced bars or parallels 28. In addition, plate 22 is provided with a pair of longitudinally spaced apart parallels 30 having slotted openings 32 at the ends thereof for receiving bolts, not shown, for securing the upper die 12 to the movable platen 16. The generally rectangular plate or die shoe 22 has a longitudinal axis 34 and a transverse axis 36 best shown in FIG. 4. The upper die 12 further includes two pairs of guide posts 38 (FIG. 1) extending from the working surface 26 of plate 22 towards the lower die 14. The guide posts 38 are fixed on one end to the plate or die shoe 22 and the other end of each post 38 is provided with a bearing retainer 40.

The upper die 12 is further provided with a pair of first cam drivers 42, a pair of second cam drivers 44 and a pair of third cam drivers 46 which extend towards the lower die 14 as shown in FIG. 1. The first, second and third cam drivers are arranged in two groups, with one of each of the first, second and third cam drivers 42, 44, and 46 being located in one group on one side of the transverse axis 36. The other cam drivers 42, 44 and 46 are in the other group and are located on the other side of the transverse axis 36 as illustrated in FIG. 1.

Figure 14:
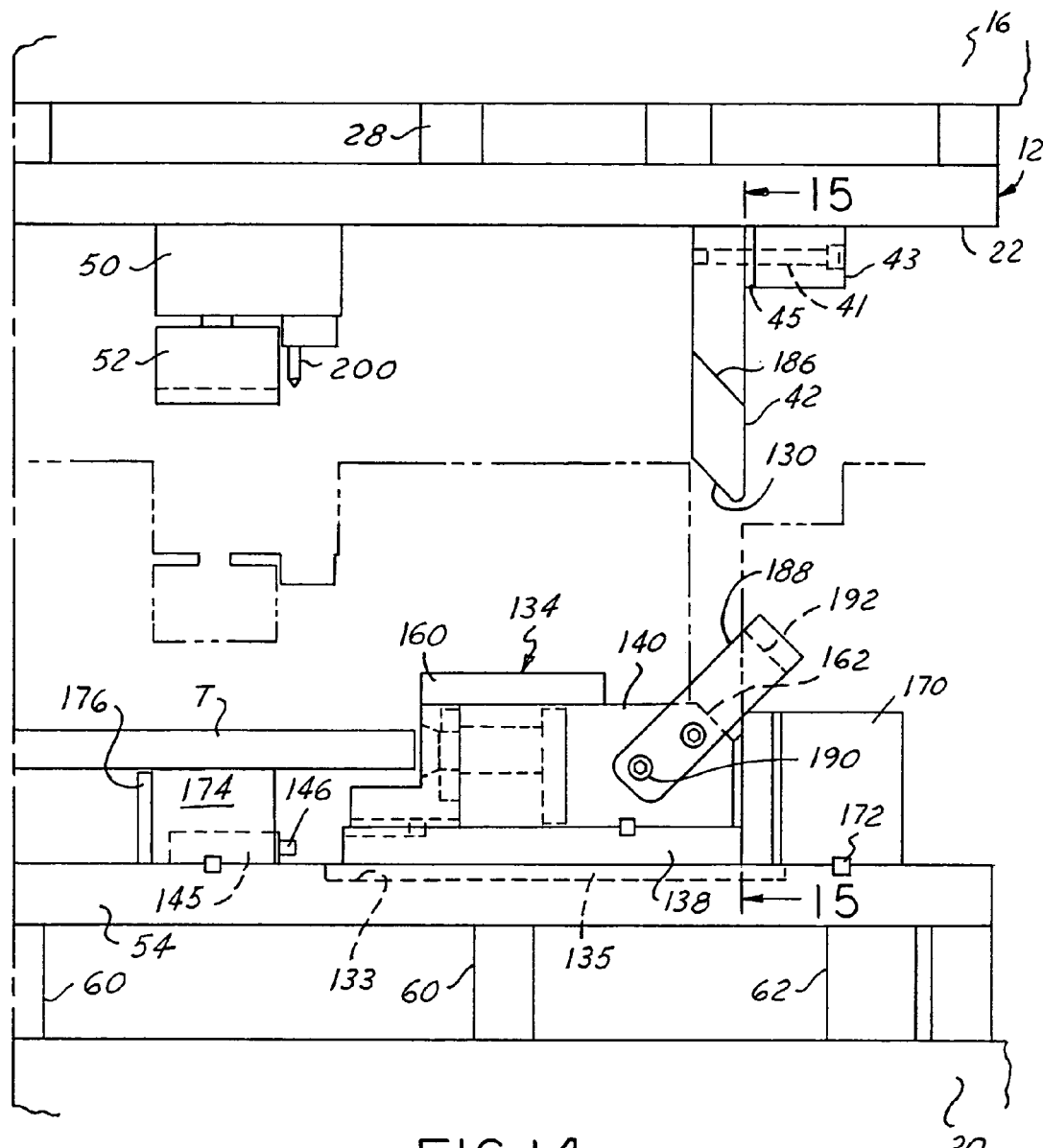
FIG. 14 is a fragmentary elevational view of the die set with the upper die including the first driver in an open position shown in solid lines and spaced from the lower die and further illustrating the partial closing of the upper and lower dies as shown by the dotted lines.
Figure 16:
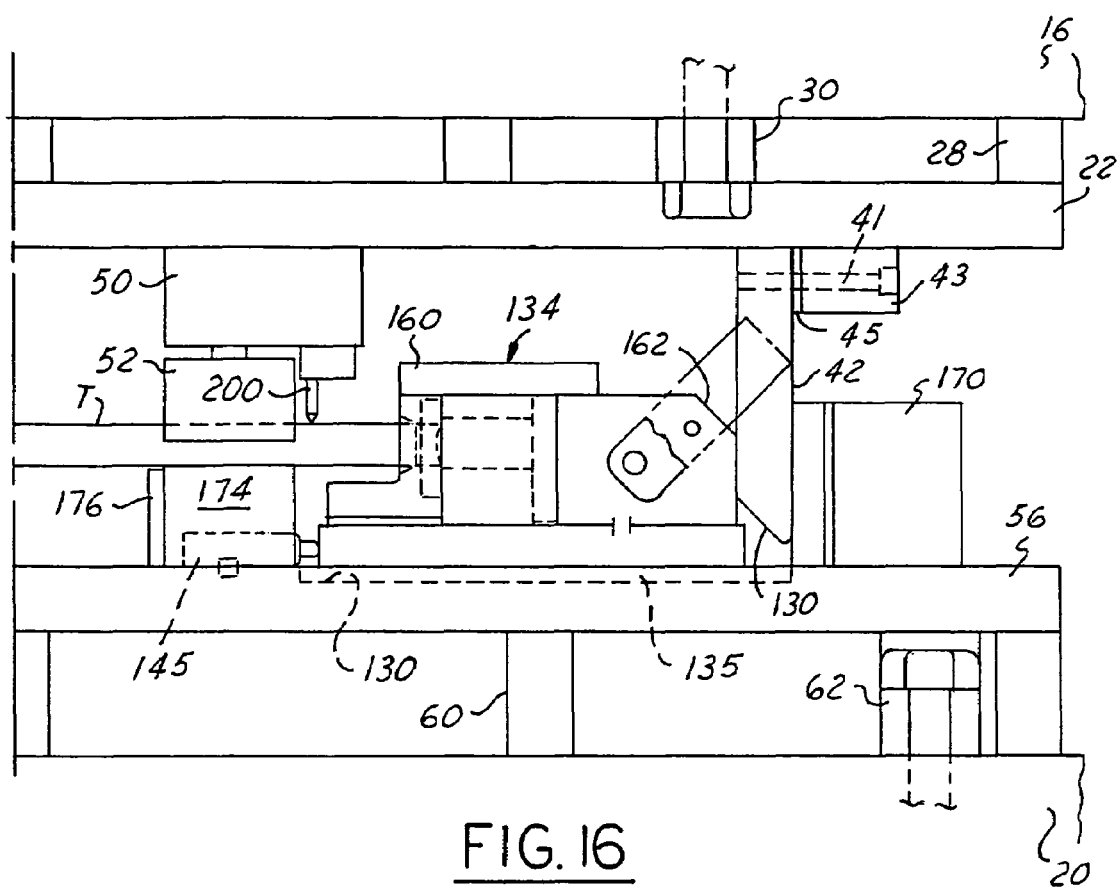
FIG. 16. is a fragmentary elevational view, similar to FIG. 14, and illustrating the die set closed, with the first driver having urged the cutter holder and cutter relative to the opposing end of a tube.

The first cam drivers 42 are secured by bolts 41 to retainers or mounting blocks 43 fixedly secured to the plate 22 as shown in FIGS. 14 and 16. Shims 45 are interposed between opposing surfaces of the first cam drivers 42 and the mounting retainers 43.

Figure 17:
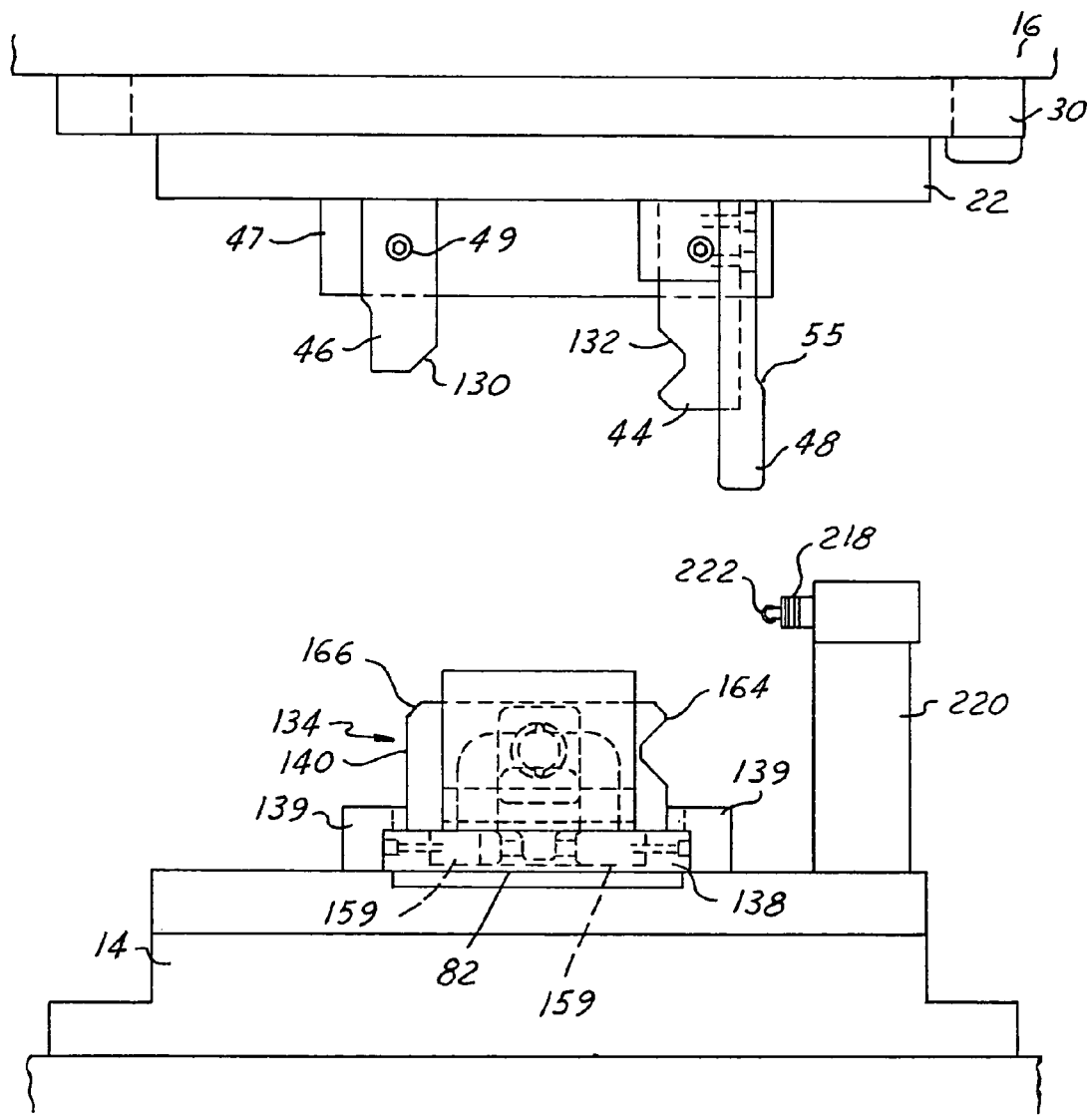
FIG. 17 is a view similar to FIG. 6 but illustrating the upper and lower dies spaced apart, with the upper die ready to be moved in a down stroke direction.

Pairs of cooperating second and third cam drivers 44 and 46 are mounted on mounting retainers 47 by fasteners or bolts 49 as shown in FIG. 17. A trigger or actuator 48 is secured by bolts to a mounting retainer 53 which is in turn bolted to the plate 22. The trigger or actuator 48 has a cam surface 55 (FIG. 17) for operating an air switch 218 to be subsequently described.

Figure 4:
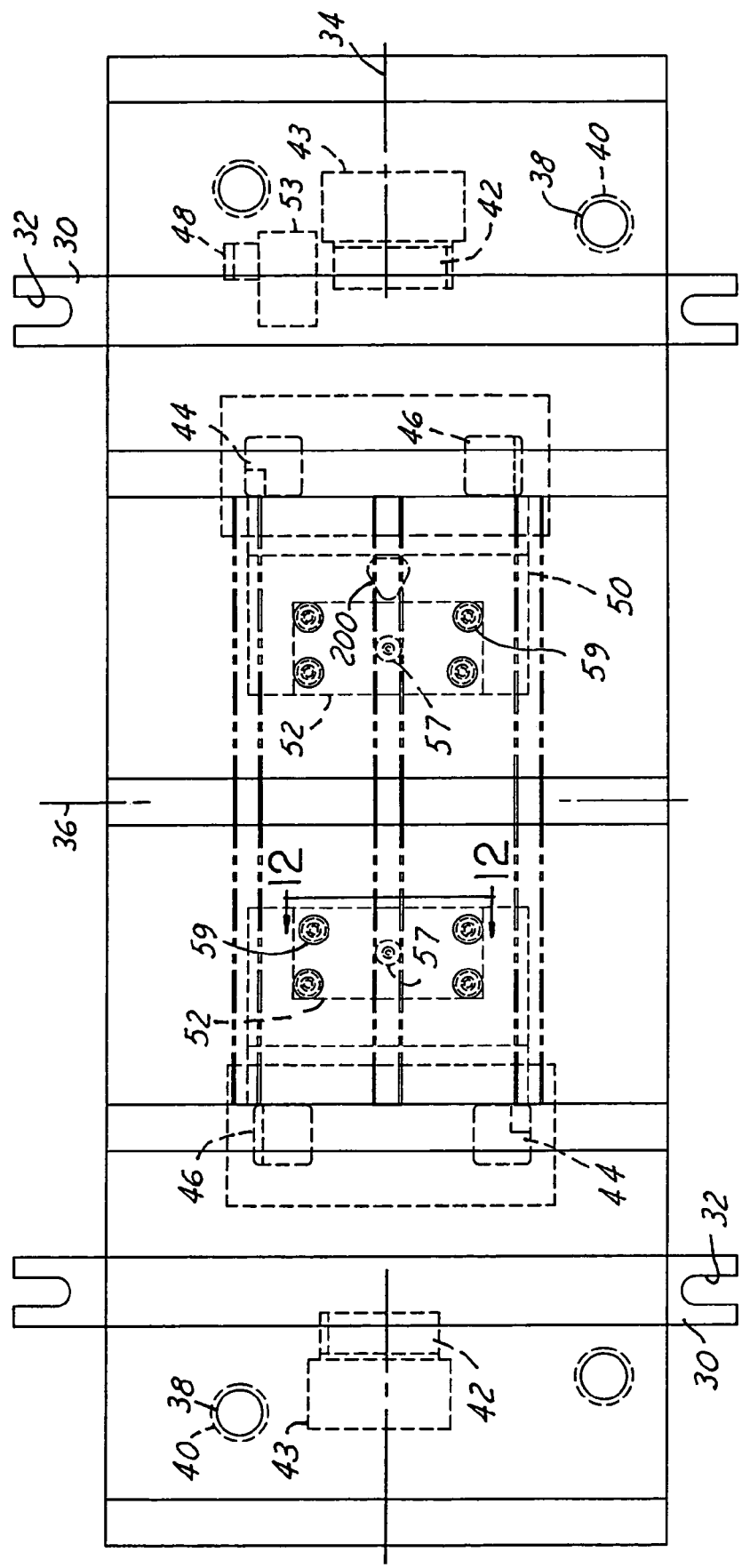
FIG. 4 is a top view of the upper die.
Figure 12:
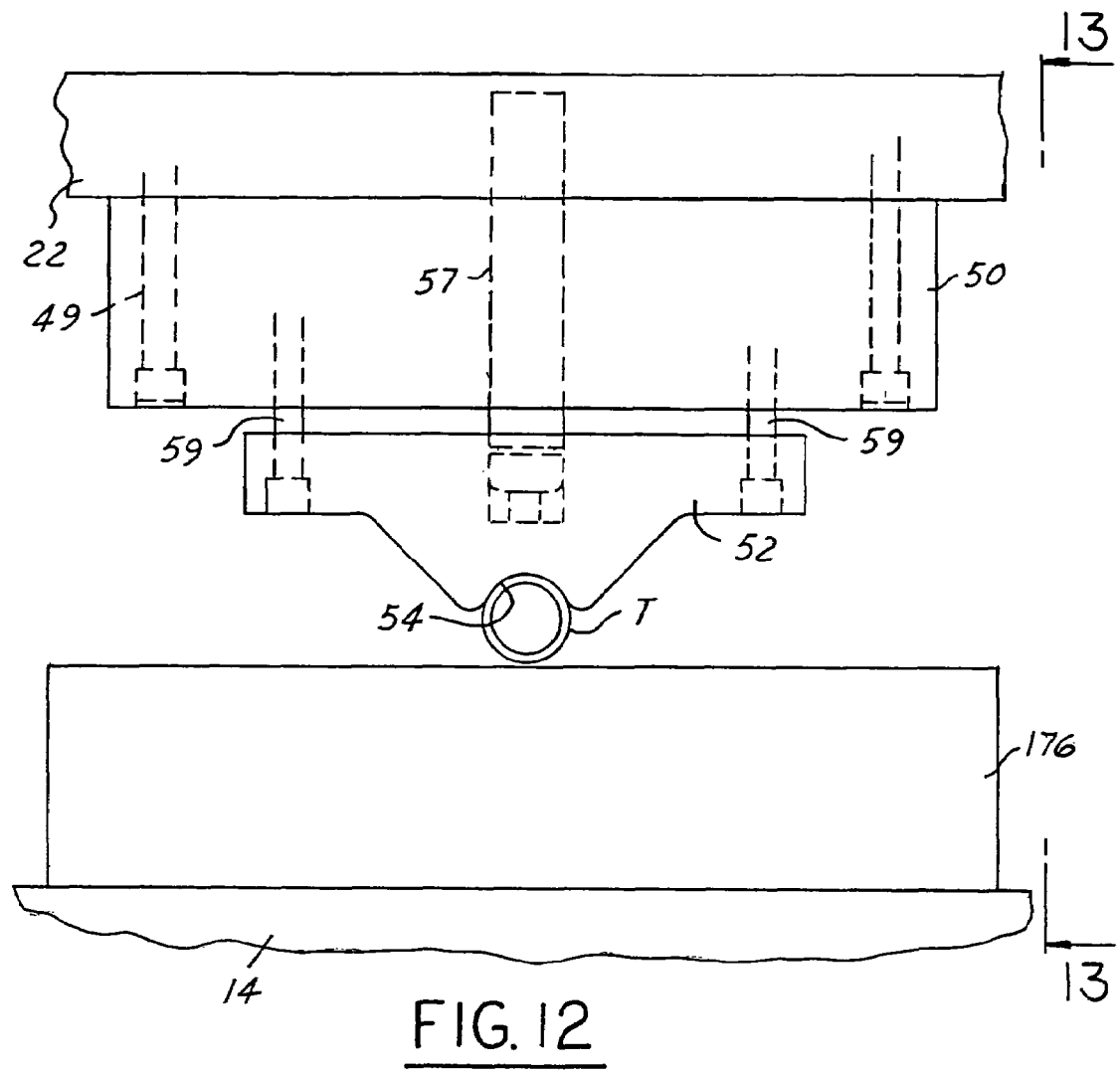
FIG. 12 is a transverse elevational view taken on the line 12—12 of FIG. 4.
Figure 11:
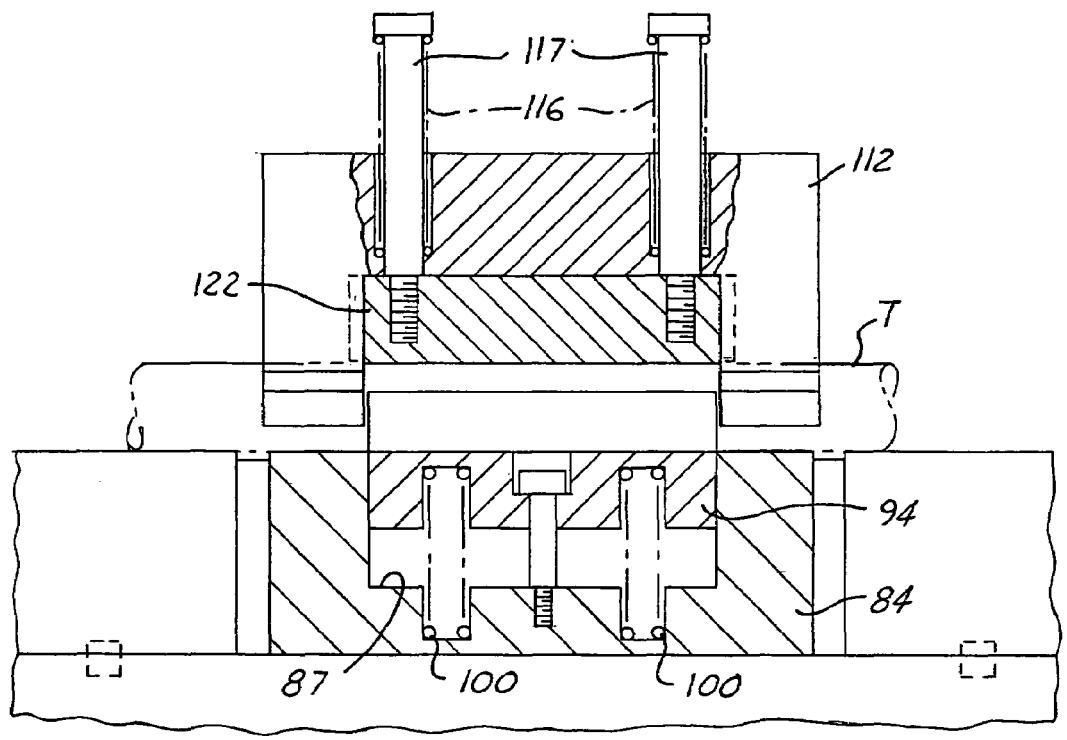
FIG. 11 is a sectional view taken on the line 11—11 of FIG. 9.
Figure 13:
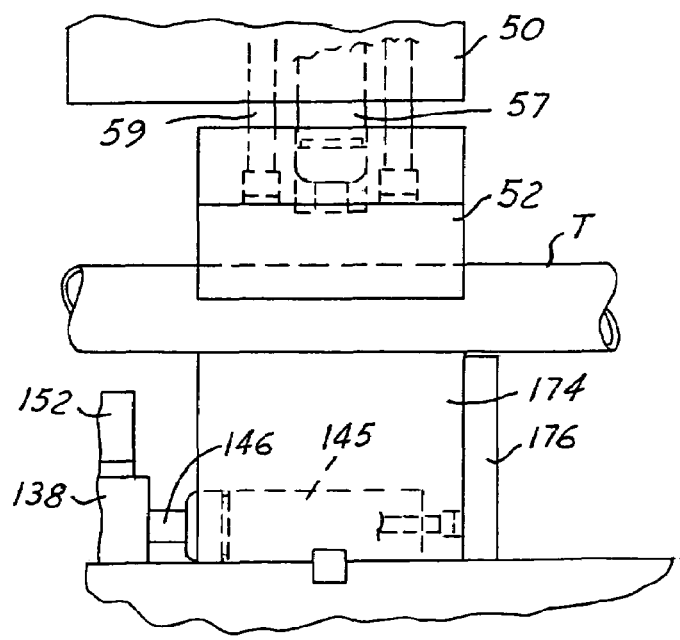
FIG. 13 in a view taken on the line 13—13 of FIG. 12.

The upper die 12 further includes a pair of retaining blocks 50 secured by bolts to the plate 22, with blocks 50 being located on opposite sides of the transverse axis 36 as shown in FIG. 1. A pair of clamps 52 are resiliently mounted on the blocks 50 by nitrogen gas springs 57 (FIGS. 3 and 12) made by Dadco, Inc. The gas springs 57 are located in the center of the clamps or pads 52 as shown in FIG. 12. The clamps 52 are further mounted on retainers 50 at the corners thereof by spools 59 by AJACS for guiding the vertical movements thereof as shown in FIGS. 4 and 12. The clamps 52 have a curvature 54 of part circular configuration so as to fit over and secure the outer periphery of the tube at the working station as will be described hereinafter.

The lower die 14 further includes a relatively thick plate or die shoe 54 having a working surface 56 and a lower surface 58. The die shoe 54 is cut away in corner areas opposite the feeder 70 as shown in FIG. 1. A plurality of parallels or parallel bars 60 are provided on the lower surface 58. The parallel bars rest upon the base 20 of the press 18. The plate 54 further includes a pair of transversely extending mounting bars 61 having lugs 62 for mounting the lower die 14 on the base 20 of the press 18. The mounting bars 61 are parallel to the bars 60. The lower die 14 includes at opposite sides thereof a pair of upwardly extending stop blocks 64 for limiting the down stroke of the upper die 12. As the press is cycled, the bearings 40 provided on the guide posts 38 of the upper die 12 move into the guide bushings 66, which are provided on the lower die 14, during the down stroke of the upper die 12.

Figure 5:
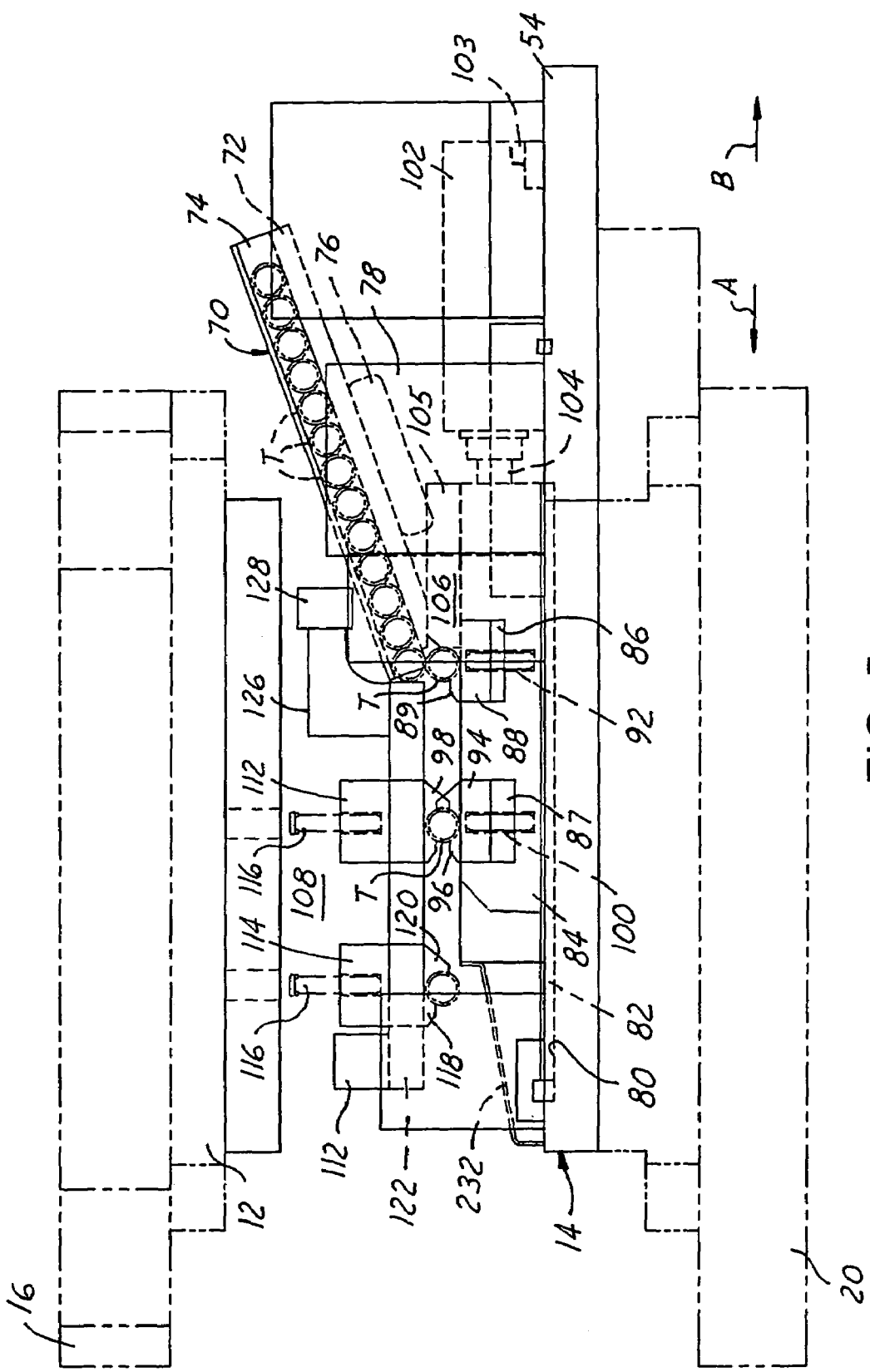
FIG. 5 is an end view of the die set showing the tube feeder for delivering a tube to the loading station from where the tube is transferred to the work station and then to the exit or discharge station.

Referring now to FIGS. 1 and 5, the hopper, magazine or feeder 70 consists of a downwardly inclined plate 72 having on opposite sides thereof guide rails 74. Tubes T are elongated work pieces which are manually or automatically fed into the hopper 70. The tubes or tubular work pieces T can be of different cross sections such as round, square, rectangular or other cross sections. The plate 72 is mounted on the lower die by retainers 76 and 78 which are secured or mounted directly or indirectly to the plate 54 of the lower die 14.

The working surface 56 of the plate 54 of the lower die 14 has a generally rectangular recess 80 in which is located a wear plate 82 (FIG. 5). Mounted on the wear plate 82 is a slideable finger rack or rail 84. The rack or rail 84 is provided in the top surface 85 thereof with a pair of cavities 86 and 87, with cavity 87 being deeper than cavity 86 as shown in FIG. 5. Located in cavity 86 is a lower finger 88 having a lip portion 89 protruding above the top of the rack 84, with the protruding lip portion 89 being curved to conform to a portion of the outside periphery of the tube T. A spring 92 is located in aligned cavities provided in the rack 84 and in the lower finger 88 and biases the finger 88 upwardly.

The recess 87 is also provided with a lower finger 94 having arcuate lip portions 96 and 98 for receiving the tube T therebetween. A spring 100 is interposed in aligned pockets or cavities provided in the rack 84 and in the second lower finger 94 and biases the finger 94 upwardly as viewed in FIG. 5.

The pneumatic cylinder 102 is mounted along the center axis by bolts 103 to the plate 54 of the lower die 14. The cylinder 102 includes a piston on the interior thereof, not shown, and a piston rod 104 suitably connected to the rack or rail 84 for moving the rack 84 in a forward direction, represented by the arrow A in FIG. 5, or in an opposite or rearward direction represented by the arrow B. The upper surface of the rack or rail 84, closest to the cylinder 102, is provided with a plate or pusher 105. The pusher 105 serves two purposes. One purpose is to prevent the tubes T in feeder 70 from existing the feeder 70 when there is a tube T at the loading station 106. The other purpose is to move the tube T from the loading station 106 to the working station 108 when the cylinder 102 is energized. Thus, pusher or plate 105 has a tube engaging surface 107 (FIG. 7) on the leading side thereof.

The rack 84 is moved in the direction of arrow A by the cylinder 102, when energized, from a loading station 106, to the working or work station 108, where the ends of the tube T are scalloped or cut, and then the cut tube is moved to the exit station 110. The three stations are shown in various stages of operation or use in FIGS. 5 and 7–10 inclusive.

The first lower finger 88 and the second lower finger 94 carried by the slideable rack or rail 84 has corresponding upper fingers 112 and 114 suitably carried by support structure on the lower die 14. The fingers 112 and 114 are of identical configuration, each having a dimension of 3 inches by 4 inches by 8 inches in length. The upper surface of each upper finger 112, 114 is provided with a cavity or pocket which receives a spring 116 and an adjustment bolt 117 which are effective to bias the corresponding upper finger towards the rail or rack 84. Each upper finger 112, 114 has a pair of protruding lip portions 118 and 120 which have curved surfaces conforming to the outer periphery of the tube T as shown in FIG. 5. The upper fingers 112 and 114 are suitably mounted in rail 122 which is in turn suitably supported by rail 124, retainer 126, rail 128 and supporting retainers on the lower die 14.

Figure 6:
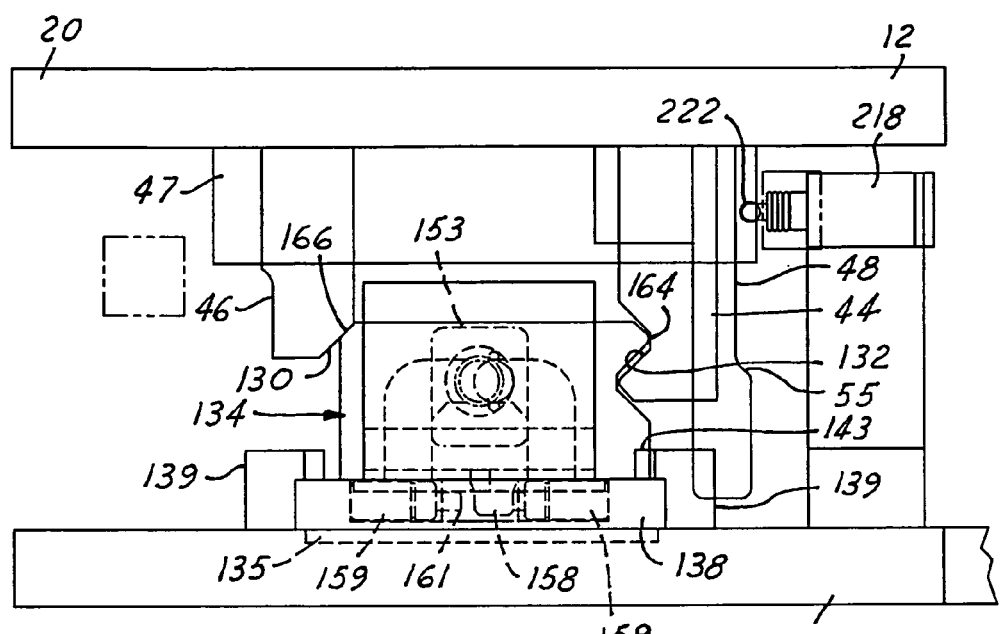
FIG. 6 is a view of the closed die set showing the relationship between the cam system and the second and third drivers for moving the slidable cutter holder at a work station.

Each of first, second and third cam drivers 42, 44 and 46 respectively has a cam surface thereon. The first driver 42 has a downwardly sloping cam surface 130 as shown in FIGS. 1 and 3. The second cam drivers 44 are each provided on one edge with an S-shaped cam surface 132 as shown in FIGS. 6 and 17. Finally, each of the third cam drivers 46 has a downwardly facing relatively flat cam surface 130. Each of the first cam drivers 42 has a height greater than the height of the second cam driver 44 and the third cam driver 46. Each of the second drivers 44 has a height greater than the height of the third driver 46 as best illustrated in FIGS. 6 and 17.

Figure 22:
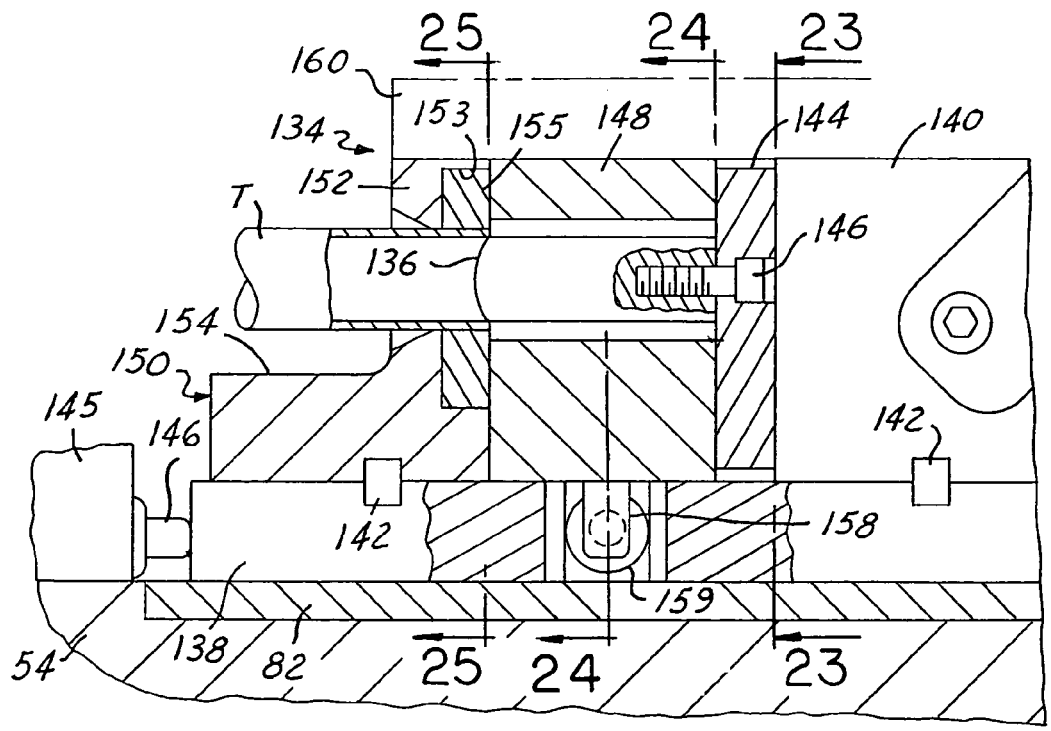
FIG. 22 is a fragmentary end view, partly in section, taken generally on the line 22—22 of FIG. 20 and illustrating the relationship between the tube, cutter, backer and retainer.
Figure 23:
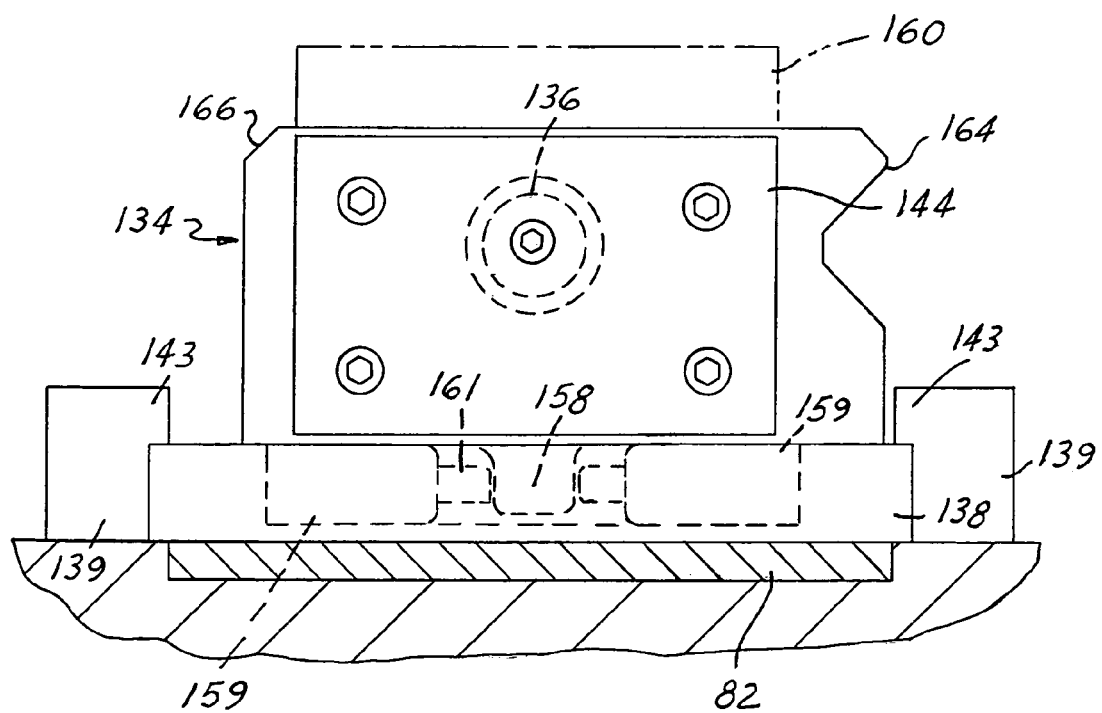
FIG. 23 is a view, partly in section, taken generally on the line 23—23 of FIG. 22 and showing the relationship between the cutter holder, actuating tab, backer, tube, sensors and with the actuating tab located between the nitrogen gas springs in a neutral position.
Figure 24:
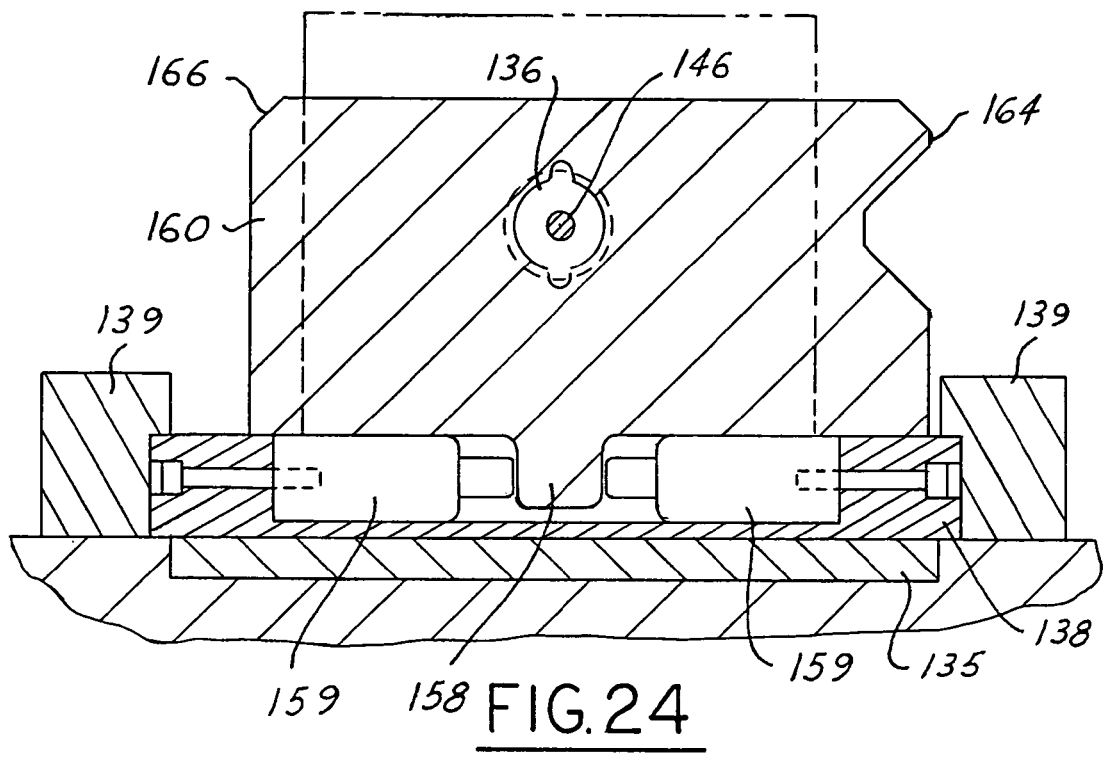
FIG. 24 is a sectional view taken generally on the line 24—24 of FIG. 22.
Figure 25:
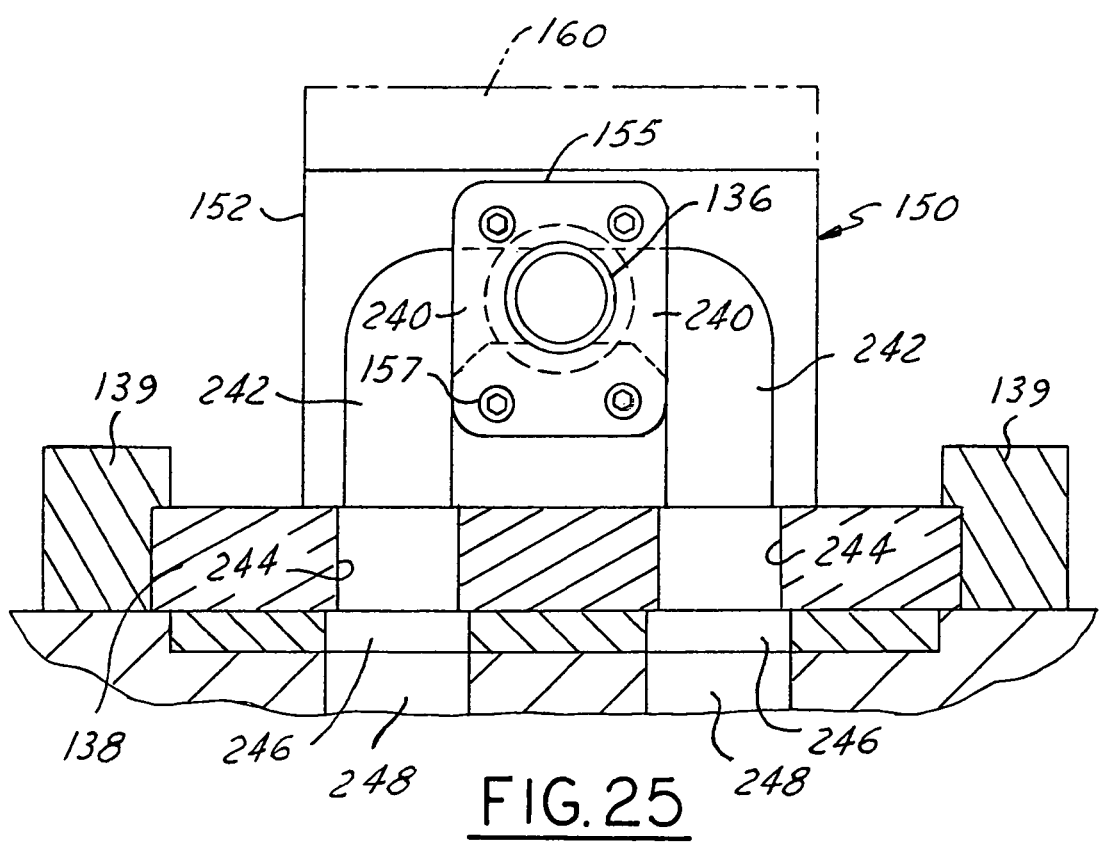
FIG. 25 is a view taken generally on the line 25—25 of FIG. 22 and showing the paths or openings through the cutter holder, slide and plate for disposing of the metal scrap once the metal has been removed from the tube.

As shown in FIG. 3, the work stations 108 are located at the opposite ends of the tube T. The work stations 108 are provided with a pair of laterally movable cutter holders 134 and cutters or cutting blades 136. The cutter holders 134 and cutters 136 are movable towards and away from the ends of the tube T as will be subsequently explained. Each cutter holder 134 consists of a generally rectangular slide 138 movable longitudinally in opposite directions on the wear plate 135 located in a recess 133 of plate 54. The longitudinal edges 137 of the slides 138 are overlapped by the keepers 139. There are two keepers 139 for each slide 138. Each keeper 139 has an overhanging flange 143 which is provided with a cam surface 141 The slides 134 are each backed up by a pair of nitrogen gas springs 145 having plungers 146. In the event the nitrogen gas springs 145 should fail or go dead, the springs cannot push back on the slides 134. When this happens, the slides 138 will grab the taper or cam surfaces 141 on the keepers 139 and pull the slides 138 out of the way to prevent the tool or die set 10 from crashing. When this occurs, the slides 138 will automatically center themselves. A guide 140 is mounted on and is connected to the slide 138 by a key 142 as shown in FIGS. 3 and 22. A backer plate 144 has one side abutting the guide 140. A cutter or blade 136 is connected to the backer 144 by a bolt 146. The cutter 136 extends axially through a retainer or cutter holder 148. An L-shaped bracket retainer 150 as viewed in FIGS. 3 and 22 has a vertical flange 152 and a horizontal flange 154 which is connected to the slide 138 by means of a key 142. The vertical flange 152 has a centrally located recess 153 in which is positioned a trim or locator 155 for receiving the end of the tube T so as to bring the tube end into cutting relationship with the cutter or blade 136. The trim or locator 155 is secured to the vertical flange 152 by bolts 157 as shown in FIG. 25. Cover 160 is suitably connected to the guide 140 and to the L-shape bracket retainer 150 by means of elongated bolts 163 which extend through the cover 160, guide 140 and retainer bracket 150.

The retainer 148, as shown in FIGS. 6 and 22–24, has an integral tab or button 158 which is biased towards the center by a pair of opposing nitrogen gas springs 159 having plungers 161. The gas springs 159 are manufactured by Dadco, Inc.

The use of the term moveable cutter holder 134 is a descriptive term used to describe the slide 138, guide 140, backer plate 144, retainer 148, trim 155 and the L-shaped bracket retainer 150. The aforesaid component parts move as a unit and form the moveable cutter holder 134 which carry the cutter or cutting blade 136. The cutter holders 134 are moveable towards the ends of the tube T and away from the ends of the tube T at the work stations 108 as shown in FIGS. 3, 14 and 16.

The first cam driver 42 at each of the work stations 108 is backed by a heel, block or retainer 170 which is made up of one or more elements bolted together The retainer 170 is connected by a key 172 to the die shoe or plate 54. The heel or retainer 170 provide backing and support for the first cam driver 42.

Located between the opposing cutter holders 134 are a pair of retainers or tube supports 174 and a pair of wear plates 176. The nitrogen gas springs 145, made by Dadco, Inc., have two gas springs for each slide 138 of the cutter holder 134, as mentioned previously. The cylinders of the gas springs 180 are keyed to the plate 54 of the lower die 14 and are secured to the opposing wear plates 176. The plungers 146 extending from the gas springs abut the slides 138 and cushion the movement thereof by the first cam drivers 42. When the first cam drivers 42 move away from the cutter holders 134 during the upstroke, the gas springs 145 return the cutter holders 134 to their original or center positions.

Each cutter holder 134 is provided with three cam surfaces, each engageable by cam surfaces provided on the three drivers. The cam surfaces 130 provided on the first drivers 42 upon the lowering of the upper die 12 is engageable with the first cam surfaces 162 provided on the cutter holders 134 as best illustrated in FIG. 14. As shown in FIG. 17, the guide 140 of each cutter holder 134 has a second cam surface 164 of S-shaped configuration and a third cam surface 166 which are engageable respectively by the second cam driver 44 and the third cam driver 46 during the downward stroke of the upper die 12. FIG. 17 illustrates the upper die 12 spaced from the lower die 14. As mentioned previously and as illustrated in FIGS. 3, 14 and 16, the cam surfaces 130 on the first cam drivers 42 initially engage the cam surfaces 162 on the cutter holders 134 to move the cutter holders 134 toward the ends of the tube T at the work station 108 where the cutters or cutting blades 136 enter the ends of the tube T.

Figure 18:
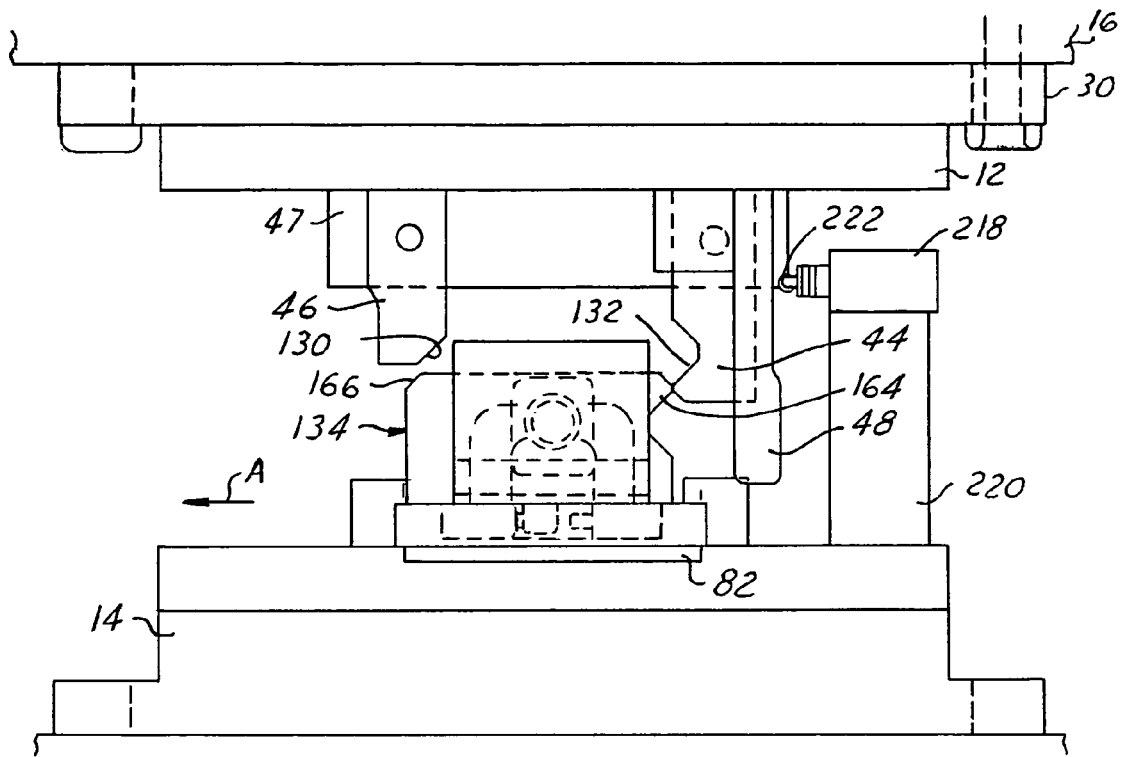
FIG. 18 is a view similar to FIG. 17 but illustrating the upper die moving in the down stroke direction, with the second driver engaging the second cam surface provided on the cutter holder and moving the cutter holder in the direction of arrow A.
Figure 19:
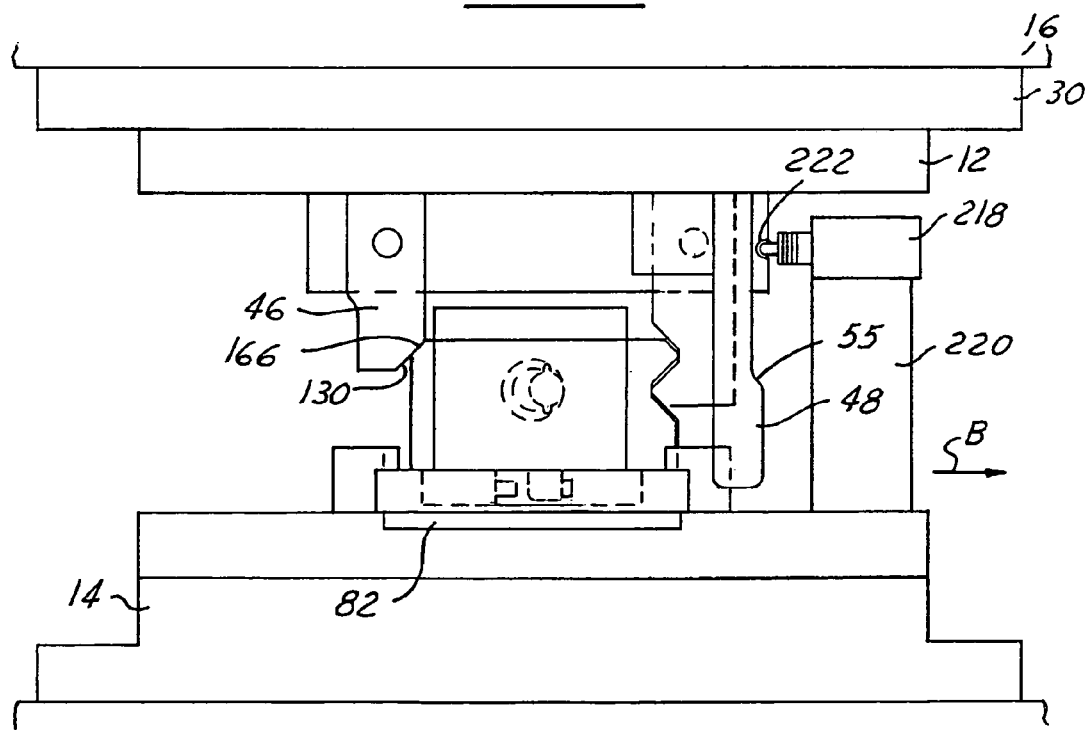
FIG. 19 is a view similar to FIGS. 17 and 18, with the upper die continuing in the down stroke direction, with the third driver engaging the third cam surface provided on the cutter holder and moving the cutter holder in the direction of arrow B.
Figure 20:
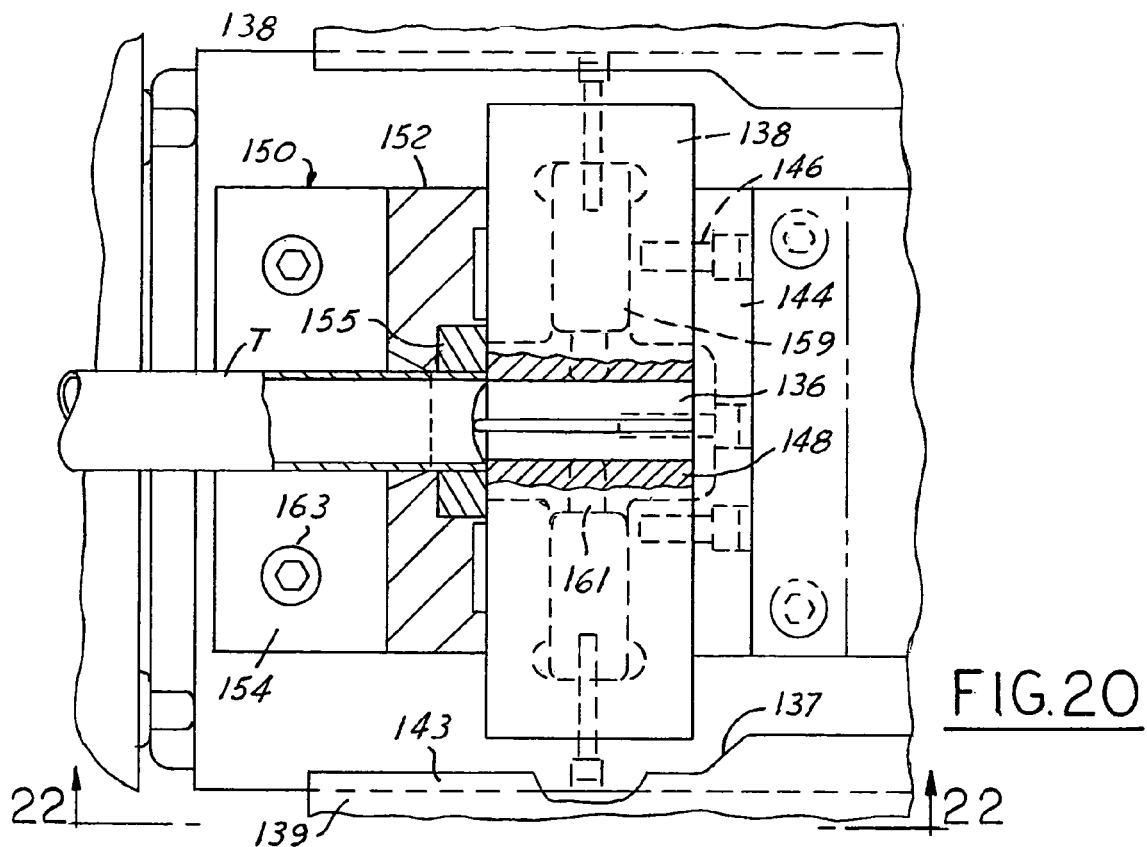
FIG. 20 is a fragmentary plan view, with parts broken away, taken generally on the line 20—20 of FIG. 3 and illustrating the cutter cutting the end of a tube.
Figure 21:
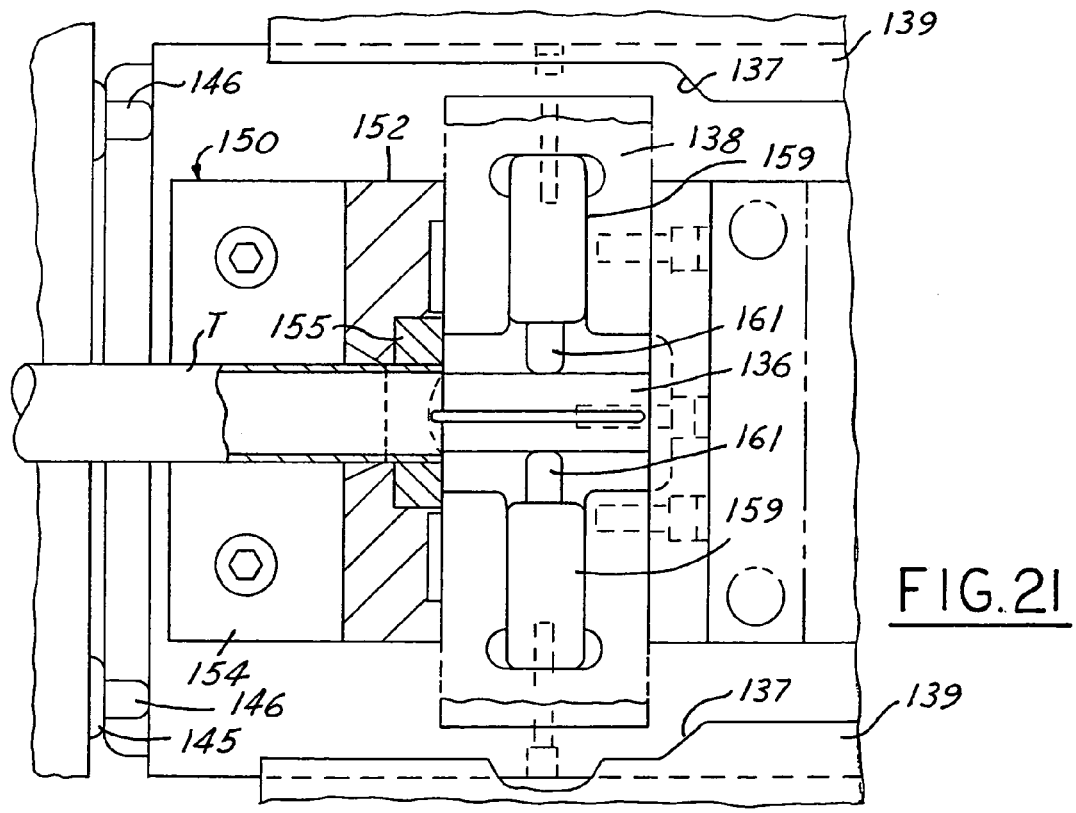
FIG. 21 is a fragmentary view similar to FIG. 20, with parts broken away, so as to illustrate the slide and the nitrogen gas springs which are bolted to the slide.

As the downward stroke of the upper die 12 continues, the second cam drivers 44 engages the second cam surfaces 164 as illustrated in FIG. 18 to drive cutter holders 134 in a forward direction, arrow A, to cut and remove metal from top to bottom in the tube T and to thereby form one side at each end of the tube. As the upper die 12 continues in its downward stroke, the cam surfaces 130 provided on the third cam drivers 46 engage the third cam surfaces 166 of the cutter holders 134 to drive the cutter holders 134 in a rearward direction (arrow B) to cut and remove metal from top to bottom and to thereby form the other side at the ends of the tube as shown in FIG. 19.

Once the ends of the tube T have been formed, the upper die 12 moves in an upstroke direction. This initially results in the third cam drivers 46 moving away from the cutter holders 134 and the second cam surfaces 134 provided on the second cam drivers 44 reengaging the cam surfaces 164 of the cutter holders 134 to drive the cutter holders in a transverse forward direction (arrow A) without cutting the tube T until the second cam drivers 44 clear the second cam surfaces 164 of the cutter holders 134.

Figure 15:
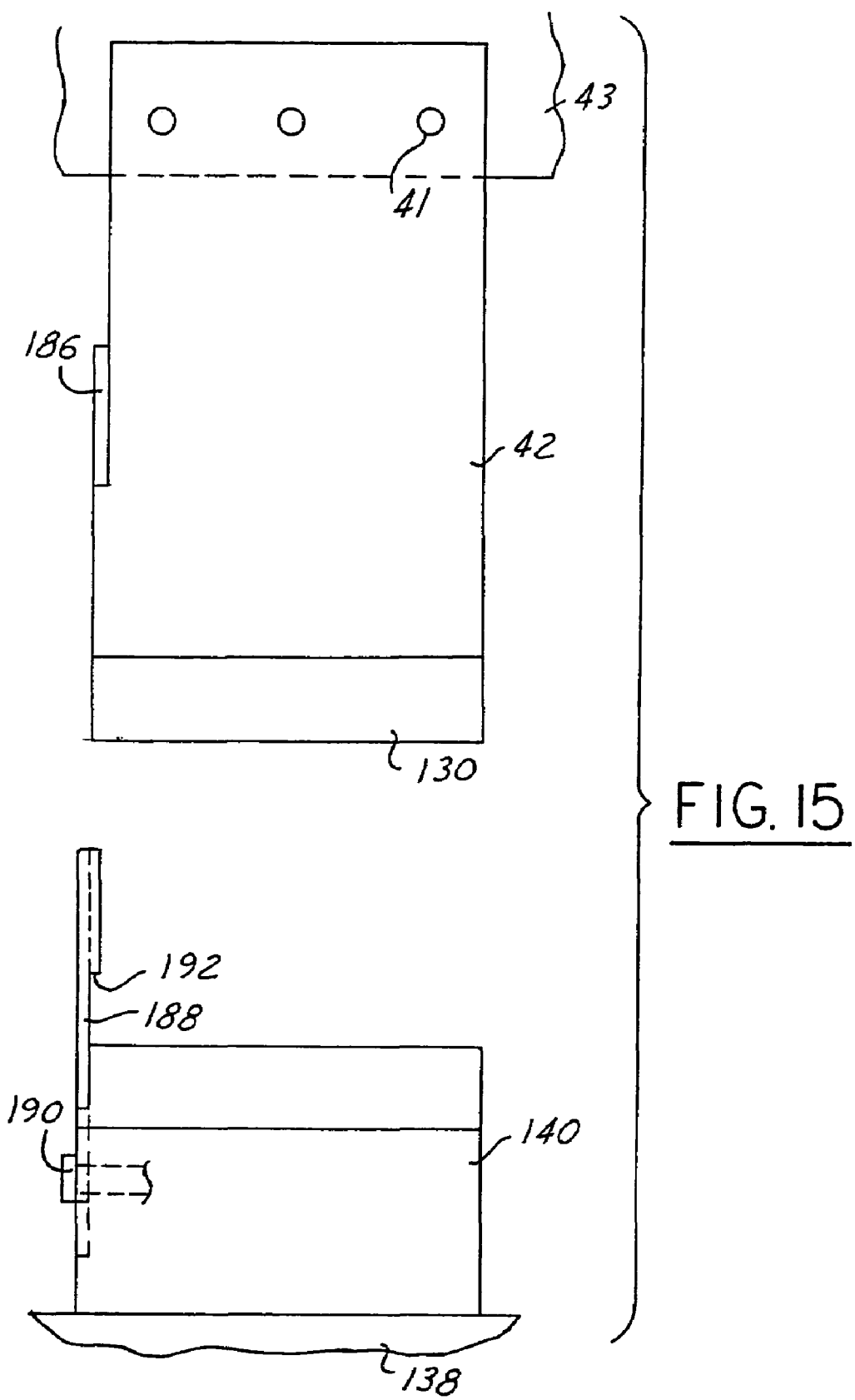
FIG. 15 is a fragmentary elevational view looking in the direction of arrows 15—15 of FIG. 14.

As shown in FIGS. 14 and 15, each first cam driver 42 has a downwardly inclined abutment surface 186 at one side of the driver 42 intermediate the ends thereof. The guide 140 has at one side thereof an upwardly and rearwardly inclined positive return bracket 188. Return bracket 188 is affixed to the guide 140 by a plurality of fasteners 190. The positive return bracket 188 has an abutment 192 engageable with the abutment 186 during the down stroke of the upper die 12 to provide a fail safe system to prevent damage to the die set 10.

One of the upper retainers 50 carrying a clamp 52 of the upper die 12 is provided with a punch 200 at the work station 108 (FIGS. 4 and 14). The purpose of the punch 200 is to place an indentation into the tube T and thereby form an identification mark in one end of the tube T during the down stroke of the upper die 12. The purpose of the mark is for the operator to identify which of the cutters or blades 136 is not performing correctly to provide a clean cut on the tube.

Figure 2A:
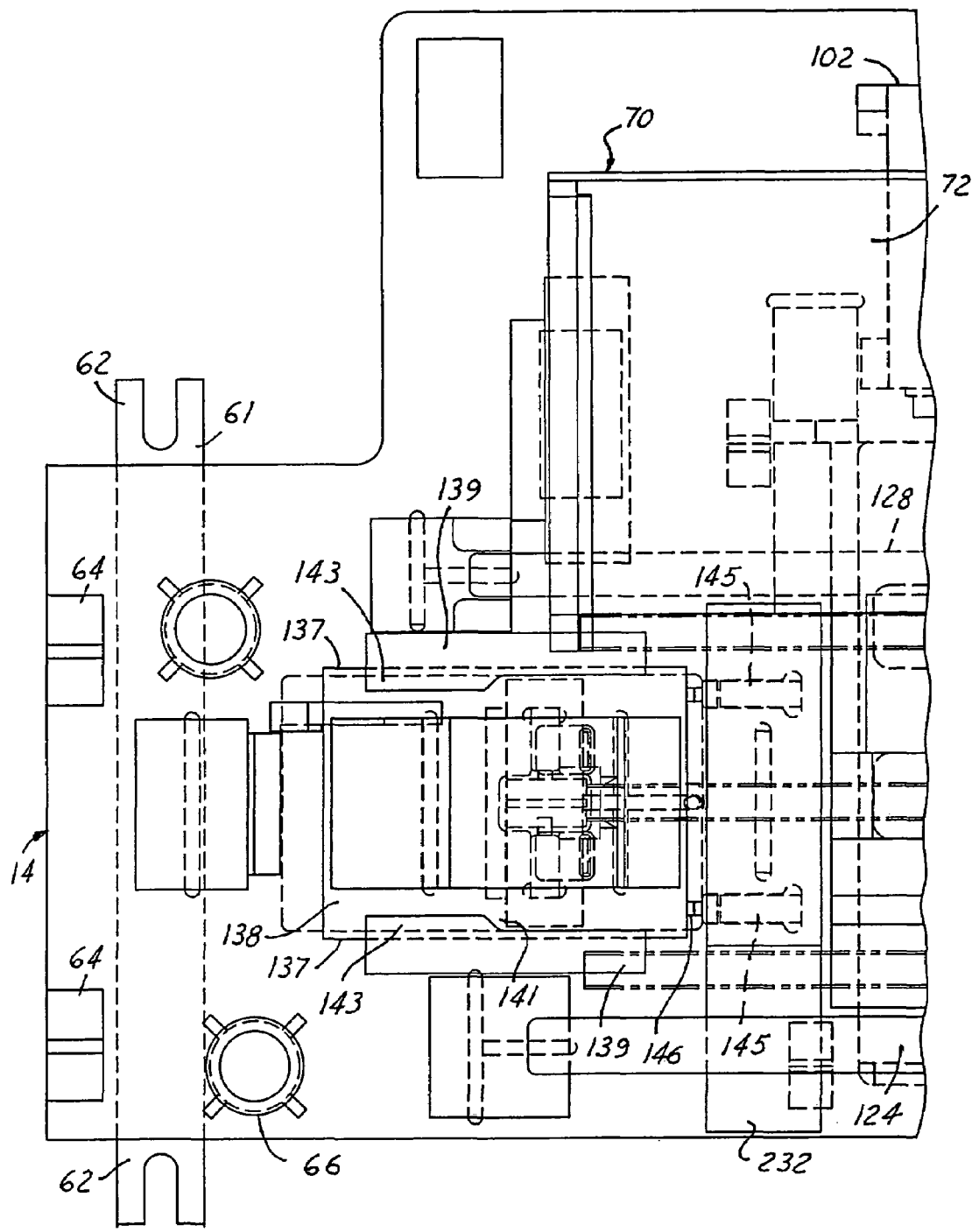
FIGS. 2A and 2B represent the top view of the left and right hand portions of the lower die.
Figure 2B:
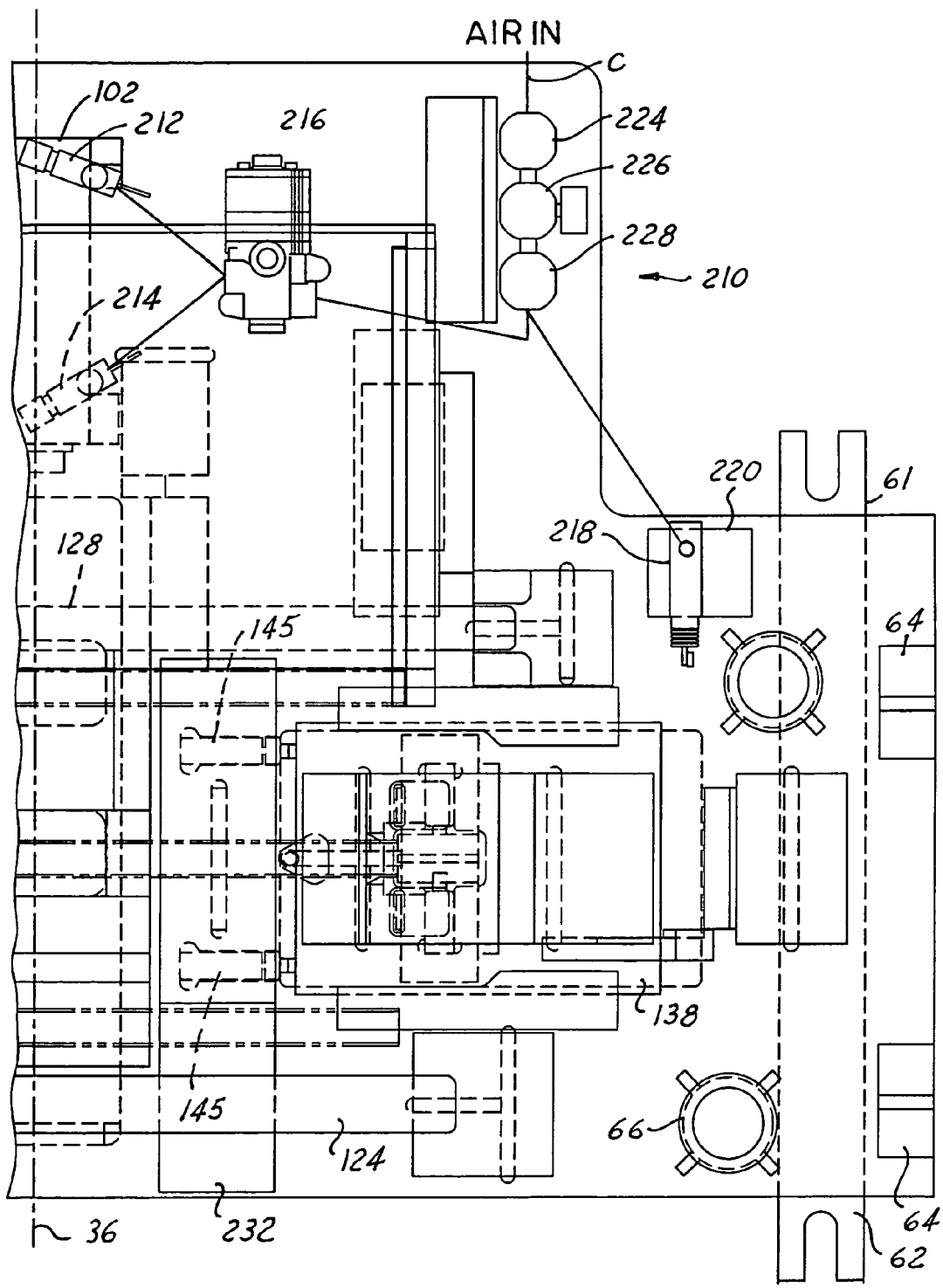

The cylinder 102 is part of a pneumatic circuit 210 as shown in FIGS. 1 and 2B. The cylinder 102 is provided with a pair of conventional ball type flow control valves 212 and 214 which are located on opposite sides of the cylinder piston, not shown. An air valve 216 made by Ross Valve is connected by tubing or pneumatic lines to the flow control valves 212 and 214 in the usual manner for directing air from one end of the cylinder 102 to the other end of the cylinder 102. An air switch 218 is mounted on an upstanding post or retainer 220 carried by the lower die 14 as shown in FIG. 17. The air switch 218 is operated by the actuator or trigger 48 carried by the upper die 12. The actuator 48 has a cam surface 55 which engages the plunger 222 of the air switch 218 thereby signaling the air valve 216 to reverse the flow of air into the cylinder 102.

The pneumatics circuit 210 further includes a combined filter 224, pressure regulator 226 and lubricator 228. The pressure regulator 226 determines the pressure of the pneumatic circuit 210. Air from an outside source, as represented by arrow C in FIG. 2B, passes through the filter 224, pressure regulator 226 and lubricator 228 and then through the air valve 216 to one or the other of the flow control valves 212, 214 to operate the piston in the cylinder 102.

The exit or discharge station 110 which receives the finished tubular product or cut tube T from the working station 108 is provided with two spaced apart chutes or chute sections 232 which are shown in FIGS. 2A, 2B, 5 and 7–10. The finished tube T is discharged by the second upper finger 114 and drops onto the downwardly inclined chutes 232 from where the cut tubes T are collected in a suitable container, not shown, for subsequent use.

Figure 7:
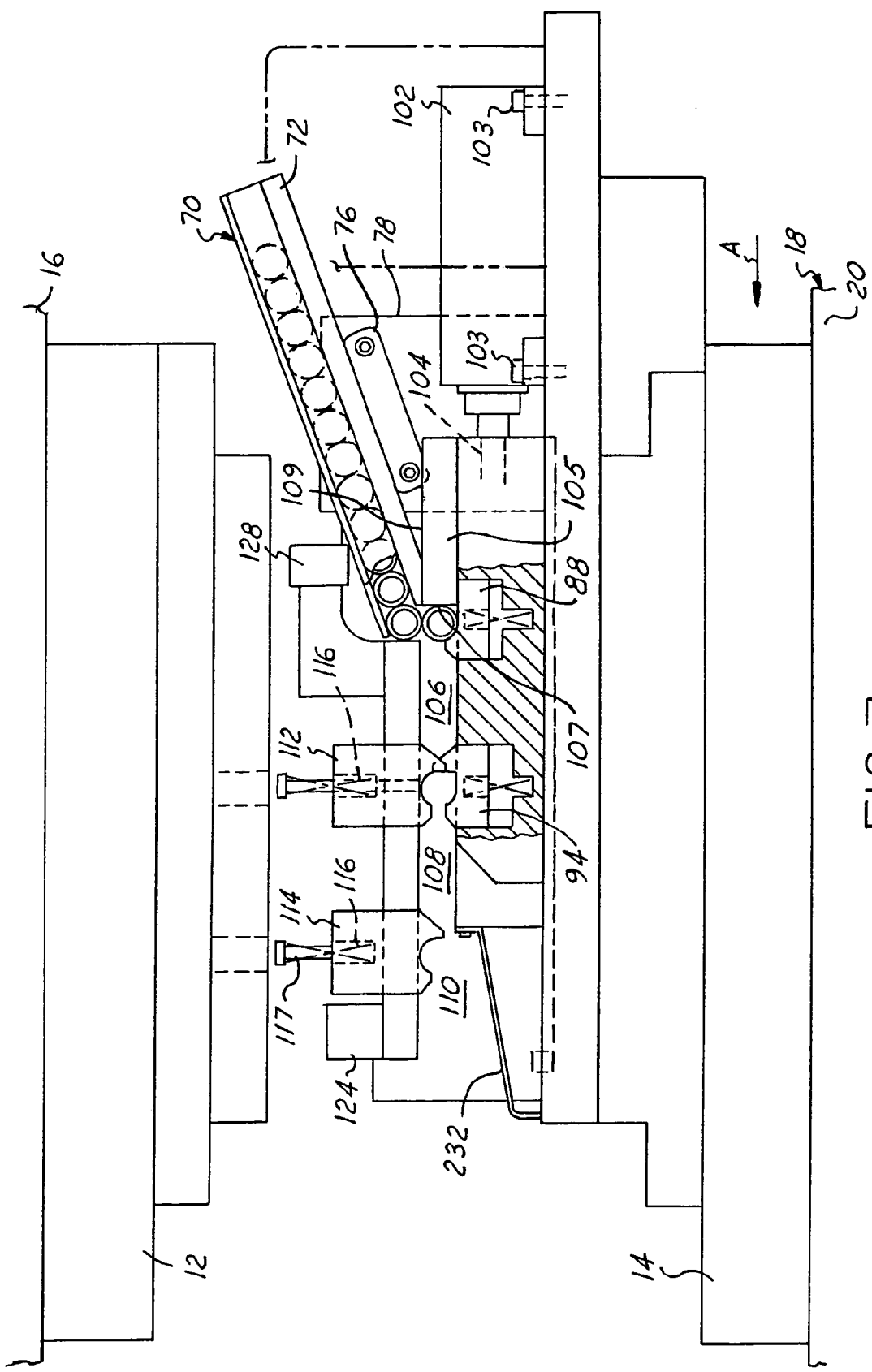
FIGS. 7, 8, 9 and 10 are end views of the die set, similar to FIG. 5, showing consecutive and sequential steps for the slidable finger rack for delivering tubes from the tube feeder to the loading station, work station and subsequently to the exit station while under the control of the pneumatic circuit and the cylinder.
Figure 8:
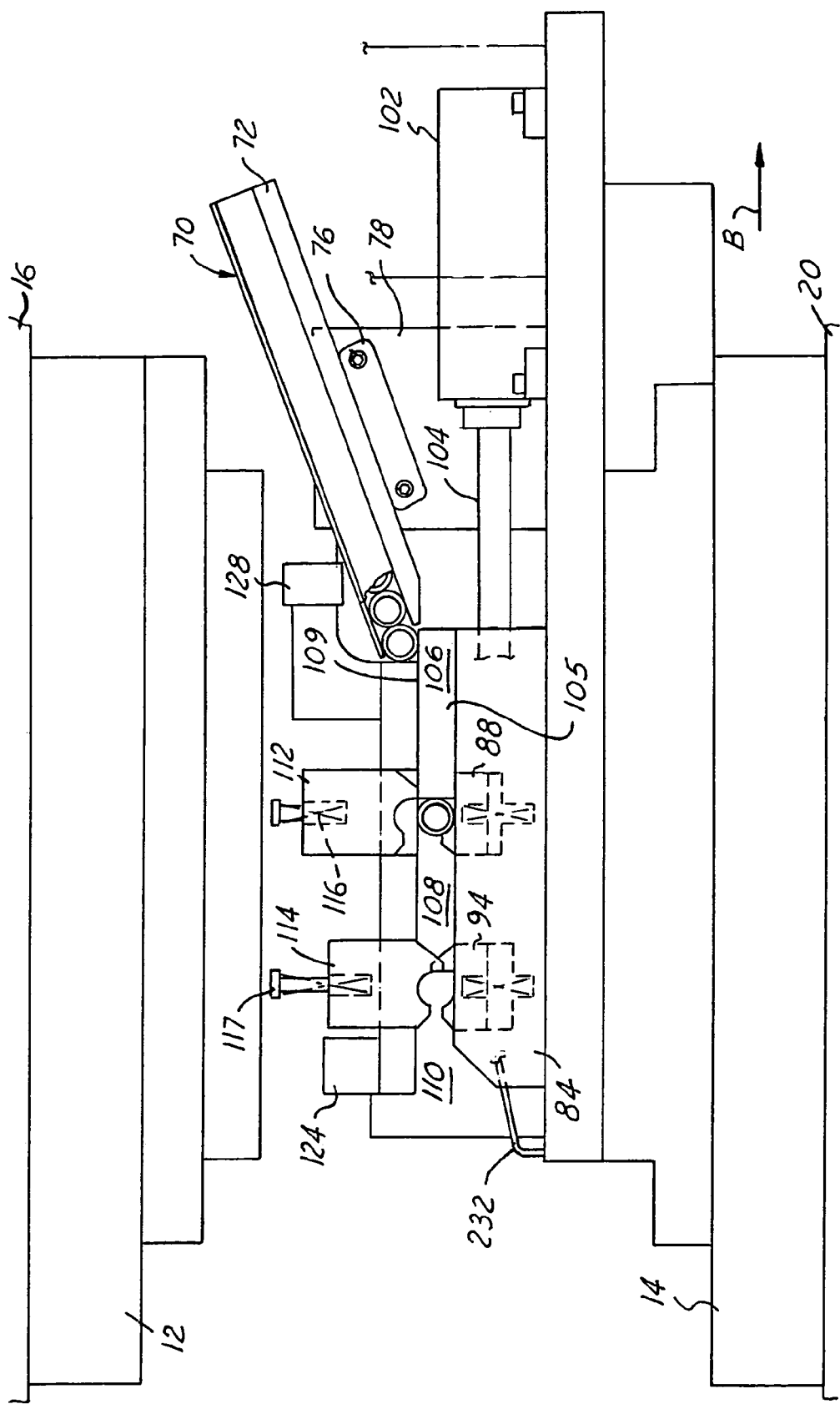
Figure 9:
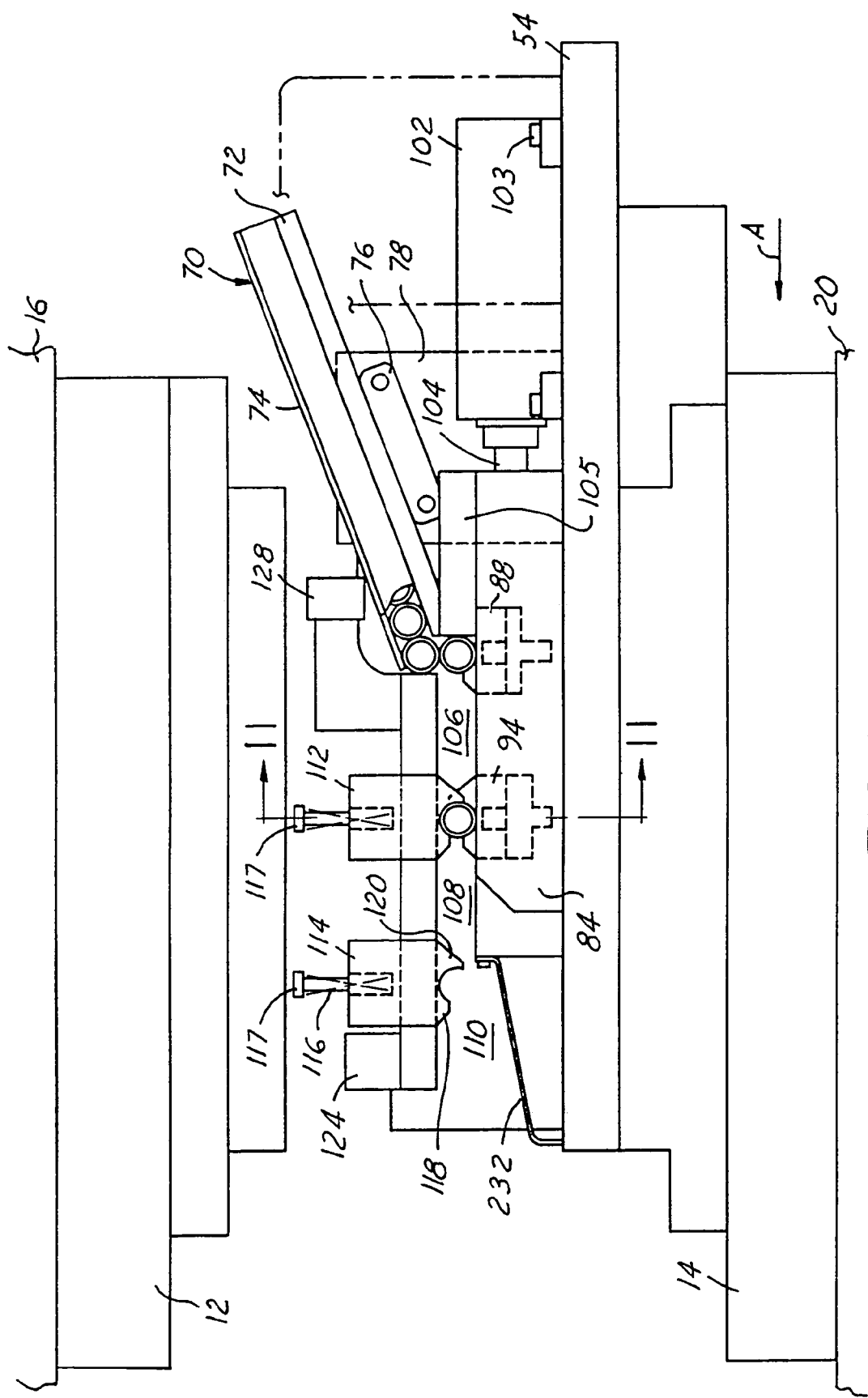
Figure 10:
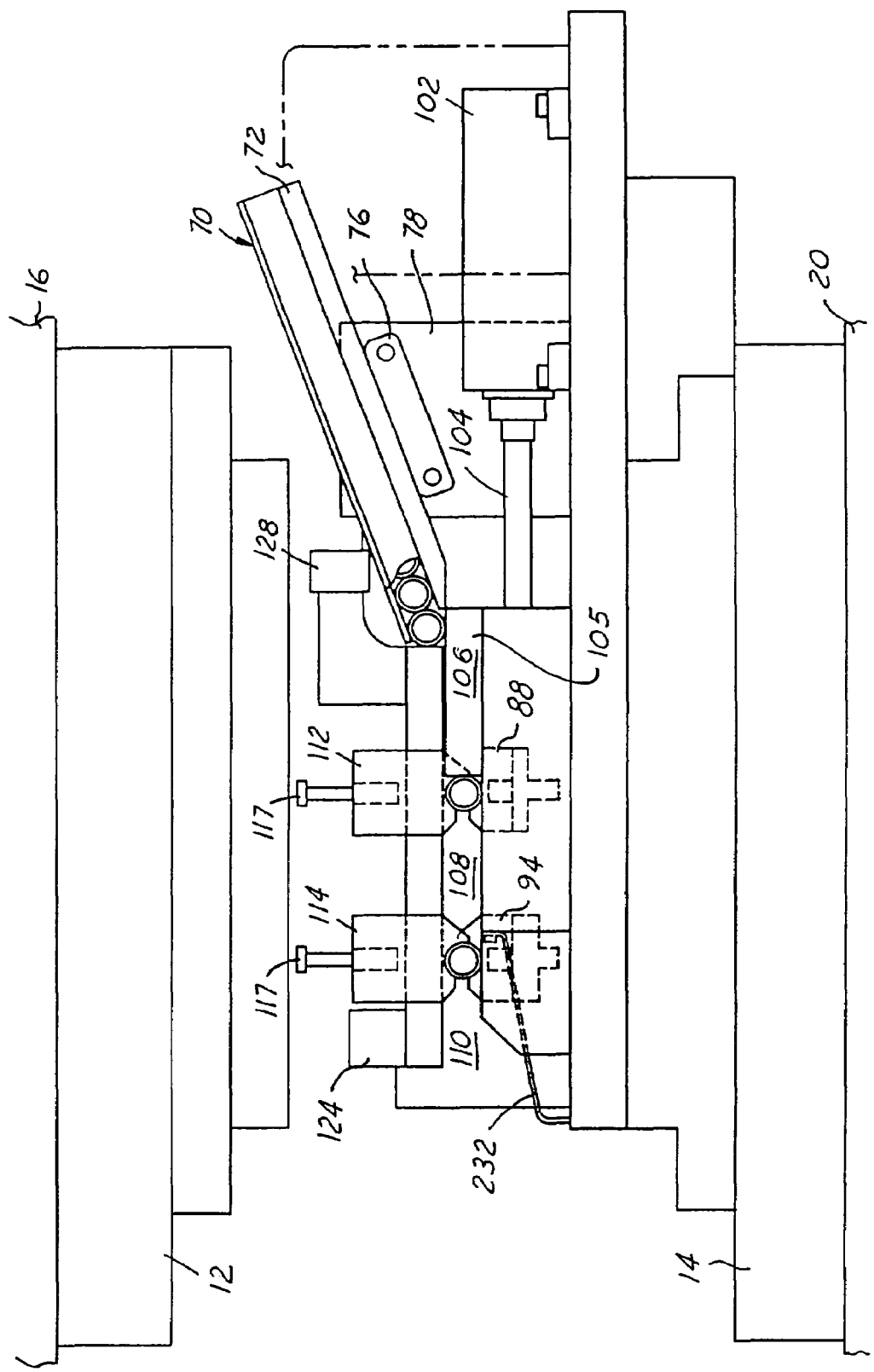

In operation, as the press 18 is cycled, the gravity fed feeder 70 initially drops a tube T into a lower finger 88 of the finger rack 84 as shown in FIG. 7. At that time, the tube T is located forwardly of the pusher or plate 105. When the cylinder 102 is actuated, the finger rack 84 moves from the position of FIG. 7 to the position of FIG. 8 to position the finger rack 84 and the finger 88 at the work station 108. When the tube T arrives at the work station 108, the tube is supported on the spaced apart supports 174 of FIG. 3. The tube T is held in place in the work station 108 by the clamps 52 carried by the upper die 12. As the upper die 12 continues in its downward stroke the triple action cam system moves the cutter holders and cutters relative to the ends of the tube T at the work station 108 as described previously. At the time the tube T is delivered to the work station 108, the upper surface 109 of the pusher member 105 extends underneath the exit end of the feeder 70 to prevent tubes from being discharged from the feeder 70 as shown in FIG. 8. As work is being performed on the ends of the tube at the work station 108, the rack 84, lower finger 88 and pusher member 105 return to their original position as shown in FIG. 9. The lower finger 94 moves under the upper finger 112 and cradles the tube T. Thus, another tube is discharged into the lower finger 88 at the loading station 106. Once the ends of the tube at the work station 108 have been cut or scalloped, the cylinder 102 is energized so as to move the rack 84 and pusher member 105 to the left as viewed by the arrow A in FIG. 9 thus moving the cut tube T and the newly delivered tube T to the left as shown in FIG. 10. The cut tube T is held between the upper finger 114 and the lower finger 94. Once the new tube is delivered to the work station 108, the rack 84, little finger 88, little finger 94 and pusher 105 are returned to their original position thus permitting the previously cut tube T to be dropped from the upper finger 114 onto the chute 232 from where the cut tubes T are collected in a suitable container.

Initially, after the tube T is moved to the working station 108, the tube T has the ends spaced from the cutter holders 134 as shown in FIG. 14. Thereafter the upper die 12 is lowered or cycled from the position shown in FIG. 14 where the cam surfaces 130 on the first cam drivers 42 engage the cam surfaces 162 on the guides 140. As a result thereof, the cutter holders 134 are moved to the left as viewed in FIGS. 14 and 16 where the ends of the tube T enter the cutter holders 134 and the cutters 136 enter the ends of the tube. The clamps 52 hold the tube T on the retainers 174 at the work station 108. As the upper die 12 continues in its down stroke, the second cam drivers 44 engages the second cam surfaces 164 provided on the cutter holders 134. As a result thereof, cutter holders 134 are moved in a transverse forward direction where the cutters 136 cut the tube T from top to bottom and thereby form one side of the ends of the tube. As the upper die 12 continues in its downward movement, the third drivers 46 engages the third cam surfaces 166 provided on the cutter holders 134 to drive the holders in a transverse rearward direction to cut from top to bottom and to thereby form the other side of the ends of the tube T.

Once the down stroke has been completed, the upper die 12 is moved away from the lower die 14. At such time, the cam surfaces 132 on the second drivers 44 reengages the second cam surfaces 164 to drive the holders 134 in a transverse forward direction without cutting the tube T until the second cam drivers 44 clear the second cam surfaces 164 of the cutter holders 134. Spring means 159 are provided for centering the cutter holders 134 before the start of the next downward stroke of the upper die 12.

When the upper die 12 is moved in its upward stroke, the actuator or trigger 48 engages the air switch 218 to move the plunger 222 inwardly to direct the air in the pneumatic circuit 210 to the other side of the piston in the cylinder 102.

Prior to the next downward stroke of the upper die 12, it is necessary to move the finished tube T from the work station 108 to the exit station 110. Prior to the tube T being removed from work station 108, the pusher 105 and the rack 104 is moved from the position shown in FIG. 8 to the position shown in FIG. 9 where the pusher member opens the discharge end of the feeder 70 whereby a tube falls into the lower finger 88. At that time, the work at the loading station has been completed, the clamps 52 are released, and a tube T at the loading station is ready to be moved to the working station 108. Thus, the cylinder 102 is reenergized to extend the piston rod 104 and move the second tube T from the loading station 106 to the work station 108 and moving the second tube T at the work station 108 to the discharge station 110 as shown in FIG. 10. Thereafter the finished tube at the exit station 110 is released by the upper finger 114 and falls down the chutes 132 to a collection area container for subsequent use.

It will be appreciated that the triple action cam tool 10 of the present invention must include some means for eliminating the four pieces of scrap metal removed from each tube T. Referring now to FIG. 25, the trim or locator 155 in which the cutter 136 extends is provided with laterally extending passages or openings 240 which communicate with passages 242 provided in the L-shaped bracket retainer 150. The ends of the passages 242 communicate with openings or passages 244 provided in the slide 138. Passages 244 in turn communicate with openings 246 provided in the wear plate 82. Finally, the passages 246 communicate with the passages or openings 248 provided in the plate 54 of the lower die 14. Thus, during each cycle of the press 18, there are two pieces of scrap metal removed from each end of the tube and those pieces find their way through the various passages enumerated from where the scrap is subsequently discharged. This cutting action results in a nice, clean, smooth edged section at each end of the tube. The tool maintains the tolerances between the tube so that each part is virtually identical.

With the triple action cam tool 10 of the present invention, the die set trims both ends of the tube at the same time. When the upper die 12 returns to an elevated position, all cams are retracted. This will allow the timing feature on the upper die 12 to trigger the air valve 218 thus allowing the air cylinder 102 to actuate. When the air cylinder 102 is actuated, a tube will advance from the loading station 106 to the working station 108. The cut tube will advance to the eject position 110 and then another tube is moved to the work position. This allows the tube to drop off the exit position, clears everything from the cut position and allows the tube to fall out of the rack into the staging position for the next cycle. Every cycle of the press produces one cut tube. It is contemplated that the tool will manufacture six to eight tubes per minute.

Each cutter 136 has two cutting edges. When the cam system actuates the cutter holders, the cutters 136 cut up both sides of the tube. The cutters 136 are interchangeable and replaceable.

The cam system of the present invention works on multiple axes. When the upper die 12 comes down, it goes over the tube that has been presented to it. When the upper die 12 engages the lower die 14, there are a pair of first cam drivers that will drive the cam system forward. Once the cam system is moved into place, there is a small mandrel or cutting edge of the cutter that goes into the inside diameter of the tube at each end thereof. As the upper die 12 continues its downward stroke, the second cam drivers will engage the second cam surfaces on the cutter holder or cam unit. This will move the cutter holder and cutter from one side to another off of center. As the upper die 12 continues in this downward stroke, the third cam drivers engage the opposing cams built into the cutter holder or cam unit and drive the cutter holders and cutters in the opposite direction off of center to go from one side to the other.

The triple action cam tool 10 has a slide system which utilizes gas springs to hold the system on center. When the detail or cutter holder is advanced, cam drivers of the upper die 12 come down on each side of the slide system and triggers the cam back and forth. Positive returns and stops are provided so that as each action is happening, the detail or cutter holder will wind up on center again, when it returns. This basically is the whole system. The cam system moves forward, side-to-side and then back to center and retracts in each cycle of the press. Cutters may be sharpened or re-cut with a wire burn and then the cutter may be shimmed from the back to provide the requisite thickness. Thus, with the present invention, multiple uses may be made for the cutter.

In use, an operator feeds the magazine or hopper 70. The operator continuously loads the magazine which would be located outside of a safety light curtain. The safety light curtain prevents the operator from placing his or her hands into the operating cam-die set system. The operator stands near the feeder to load the magazine. The tubes roll down the magazine to the loading station. At the first loading station, the tubes are staged, waiting to go into the cutting tool or working station which is the middle station. When the air cylinder 102 is actuated, the die is opening. When the die is opened, the unit is indexed forward, pushing one tube that has just been cut to the exit position allowing it to fall into a chute and placing another tube that needs to be cut into the working station when it retracts. There is a cam on the air cylinder that is telling it that the tool is retracting so the unit retracts leaving the tubes locked in place with a series of little fingers. The major guide centers, holds it in place and then the cam starts this action again, driving the detail or cutter holder from side-to-side action to cut, back to center on return. The cams provide a positive return and the nitrogen springs bring the detail back to center. Gas springs are utilized for applying pressure to maintain the device on center. Also the gas springs are pushing the cam system out of the way. If the cam system decides not to come back to center, there is a set of guides which will put it back on center and are referred to herein as positive returns. In case the springs fail, the tool is still retracted and out of the way for safety purposes thus preventing the tool from crashing and tearing up the tool.

The die set 10 includes a number of proximity sensors, 24 volts, for assisting in the operating movements of the triple action cam system.

The triple action cam die set of the present invention may include only one set of first, second and third drivers with cam surfaces working with a single cutter holder and cutter for scalloping only one end of a tube.

What is claimed is:

1. A die set comprising:
   an upper die having a downward stroke and an upward stroke;
   a lower die cooperating with said upper die;
   first, second and third cam drivers which are spaced apart depending from said upper die and extending toward said lower die;
   said second and third cam drivers being spaced inwardly from said first cam driver;
   said cam drivers each having on one edge a cam surface;
   a work station in said lower die for receiving a tube;
   a laterally moveable cutter holder and cutter at said work station which are moveable relative to an end of the tube;
   said cutter holder movable in a forward direction and in a rearward direction relative to the tube;
   said movable cutter holder having first, second and third cam surfaces thereon which are engageable respectively by said first, second and third cam drivers during the downward stroke of said upper die;
   the cam surface of said first cam driver when said upper die is moving through a downward stroke, engaging the first cam surface on said cutter holder and thereby moving said cutter holder towards the end of the tube at the work station where said cutter enters the end of the tube;
   said second cam drivers during the continuing of the downward stroke of said upper die engaging the second cam surface of said cutter holder to drive said cutter holder in the forward direction to cut and thereby form one side of the end of the tube;
   said third cam driver during the continuing of the downward stroke of said upper die thereafter engaging the third cam surface of said cutter holder to drive said cutter holder in the rearward direction to cut and thereby form the other side of the end of the tube;
   said second cam driver during the upward stroke of said upper die reengaging the second cam surface of said cutter holder to drive said cutter holder in the transverse forward direction without cutting the tube until said second driver clears the second cam surface of said cutter holder.

2. The die set as set forth in claim 1, wherein means are provided for centering said cutter holder before the start of the next downward stroke of said upper die.

3. The die set as set forth in claim 1, wherein said first cam driver has a height greater than the height of said second and third cam drivers.

4. The die set as set forth in claim 3, wherein said second cam driver has a height greater than the height of said third cam driver.

5. The die set as set forth in claim 1, wherein said first cam driver has a downwardly facing cam surface.

6. The die set as set forth in claim 1, wherein said first cam driver has a downwardly inclined abutment surface engageable with an abutment on a positive return bracket located on said cutter holder to provide a fail safe system to prevent damage to the die set.

7. The die set as set forth in claim 1, wherein the cam surface provided on said second cam driver is of S-shape configuration.

8. The die set as set forth in claim 1, wherein the cam surface provided on said third cam driver has a downwardly facing flat surface at one corner thereof.

9. The die set as set forth in claim 1, wherein a punch is carried by said upper die at said work station to place an indentation in one end of the tube which forms an identification mark during the downward stroke of said upper die.

10. The die set as set forth in claim 1, wherein said lower die is provided with a pair of support elements for cradling the tube at said work station; and said upper die is provided with a pair of clamps opposite the support elements on the lower die for clamping the opposite surfaces of the tube as the tube is being cut.

11. The die set as set forth in claim 10, wherein said clamps which are carried by said upper die are resiliently biased.

12. A die set comprising:
   an upper die having a downward stroke and an upward stroke;
   a lower die cooperating with said upper die;
   said upper die having a longitudinal axis and a transverse axis perpendicular thereto;
   first, second and third cam drivers depending from said upper die and extending toward said lower die;
   said first, second and third cam drivers being located at one side of said transverse;
   said first cam driver intersecting said longitudinal axis;
   said second and third cam drivers being spaced transversely apart on opposite sides of said longitudinal axis;
   said second and third cam drivers being spaced inwardly from said first cam driver;
   said cam drivers each having on one edge a cam surface;
   a slideable finger rack on said lower die having a pair of upwardly opening lower fingers with recesses for receiving tubes;
   a cylinder on said lower die attached to said finger rack for moving said rack from a loading station where a tube is gravity fed into a finger recess and for then moving said rack to a work station where one end of the tube is cut and then for moving the cut tube to an exit station where the tube is discharged from the die set;

said work station having a laterally moveable cutter holder and cutter which are moveable into and out of engagement with one end of the tube;

said cutter holder also being movable in a transverse forward direction and in a transverse rearward direction relative to the tube;

said movable cutter holder having first, second and third cam surfaces thereon which are engageable respectively by the cam surfaces of said first, second and third cam drivers during the downward stroke of said upper die;

the cam surface of said first driver when said upper die is moving through a downward stroke, engaging the first cam surface on said cutter holder and thereby moving said cutter holder towards said one end of the tube at the work station where said cutter enters the tube;

said second driver during the continuing of the downward stroke of said upper die engaging the second cam surface of said cutter holder to drive said cutter holder in a transverse forward direction to cut and thereby form one side of the end of the tube;

said third driver during the continuing of the downward stroke of said upper die thereafter engaging the third cam surface of said cutter holder to drive said cutter holder in a transverse rearward direction to cut and thereby form the other side of the end of the tube; and said second driver during the upward stroke of said upper die thereafter reengaging the second cam surface of said cutter holder to drive said cutter holder in a transverse forward direction without cutting the tube until said second driver clears the second cam surface of said cutter holder.

13. The die set as set forth in claim 12, wherein means are provided for centering said cutter holder before the start of the next downward stroke of said upper die.

14. The die set as set forth in claim 12, wherein an air switch is mounted on said lower die; and an actuator is carried by said upper die which is engageable with said air switch during said upward stroke for signaling said cylinder to reverse the movement of said upper die.

15. The die set as set forth in claim 14, wherein said cylinder and said air switch are part of a pneumatic circuit which includes flow control valves mounted in said cylinder on opposite sides of the piston provided therein; an air valve connected to said flow control valves for directing air from one end of said cylinder to the other end; and said air switch when operated by said actuator signaling said air valve to reverse the flow of air into said cylinder.

16. The die set as set forth in claim 15, wherein said pneumatic circuit further includes a pressure regulator for determining the pressure in said pneumatic circuit.

17. The die set as set forth in claim 12, wherein said first cam driver has a height greater than the heights of said second and third cam drivers.

18. The die set as set forth in claim 17, wherein said second cam driver has a height greater than the height of said third cam driver.

19. The die set as set forth in claim 12, wherein said first cam driver has a downwardly facing cam surface.

20. The die set as set forth in claim 12, wherein said first cam driver has a downwardly inclined abutment surface; a positive return bracket mounted on said cutter holder; said bracket having an abutment surface engageable with the abutment surface on said first cam driver to provide a fail safe system to prevent damage to the die set.

21. The die set as set forth in claim 12, wherein the cam surface provided on said second cam driver is of S-shape configuration.

22. The die set as set forth in claim 12, wherein the cam surface on said third cam driver has a downwardly facing flat surface at one corner thereof.

23. The die set as set forth in claim 12, wherein said finger rack is provided with a pair of cavities in which said lower fingers are located.

24. The die set as set forth in claim 23, wherein said lower fingers are biased for limited vertical movement by springs located in the cavities of said rack and said lower fingers.

25. The die set as set forth in claim 23, wherein a support is mounted on said lower die; a pair of upper fingers are carried by said support; said upper fingers having downwardly facing tube receiving recesses which cooperate with corresponding recesses provided in said lower fingers.

26. The die set as set forth in claim 25, wherein said upper fingers are spring biased for limited vertical movement.

27. The die set as set forth in claim 12, wherein a downwardly inclined tube feeder is mounted on said lower die above said cylinder, said feeder having an entrance at the top and an exit end at the bottom of the feeder; said feeder being located above one of the lower fingers at said loading station.

28. The die set as set forth in claim 27, wherein said rack on the upper surface thereof is provided with a tube engaging pusher that moves with said rack; said rack when moved by said cylinder in the forward direction moves said pusher underneath the exit of said feeder resulting in the tube moving from the loading station to the work station, with said pusher extending across the exit of said feeder to prevent tubes from exiting said feeder into said loading station.

29. The die set as set forth in claim 28, wherein while work is being performed on an end of the tube at said work station, said cylinder is energized to move said rack in the rearward direction to return said pusher and said rack to their original position thereby opening the exit at the bottom of the feeder, resulting in another tube from the exit of said feeder being gravity fed into the underlying lower finger at said loading station, said rack and said pusher then being moved by said cylinder in the forward direction where said pusher is moved underneath the exit of said feeder, the tube at said loading station is moved to the work station and the tube at the work station is simultaneously released by one of said upper fingers and exits the die set at said exit station.

30. The die set as set forth in claim 29, wherein a chute is provided at the exit station for receiving finished tubes.

31. The die set as set forth in claim 30, wherein said chute is divided into two longitudinally spaced apart sections which are mounted on said lower die in order to receive the ends of the tubes.

32. The die set as set forth in claim 12, wherein a punch is carried by said upper die at said work station to place an indentation in one end of a tube which forms an identification mark during the downward stroke of said upper die.

33. The die set as set forth in claim 12, wherein said upper die is provided at opposite sides with a pair of guide posts, each post being fixed on one end to said upper die and on the other end to a bearing retainer;

said lower die being provided at opposite sides with upstanding guide bushings; and said bearing retainers being received in said guide bushings during the downward stroke of said upper die.

34. The die set as set forth is claimed 12, wherein said upper die is provided at opposite sides with a pair of guide posts, each post being fixed on one end to said upper die and on the other end to a bearing retainer;
said lower die being provided at opposite side with upstanding guide bushings; and
said bearing retainer being received in said guide bushing during the downward stroke of said upper die.

35. A triple action cam die set for cutting the ends of metal tubes comprising:
an upper die having a downward stroke and an upward stroke;
a lower die cooperating with said upper die;
said upper die having a longitudinal axis and a transverse axis perpendicular thereto;
pairs of first, second and third cam drivers depending from said upper die and extending toward said lower die;
one of each of said first, second and third cam drivers being located at one side of said transverse axis and the other of each of said first, second and third cam drivers being located on the other side of said transverse axis;
said first cam drivers being spaced apart and intersecting said longitudinal axis;
said one second and third cam drivers and said other second and third cam drivers being spaced transversely apart on opposite sides of said longitudinal axis;
said second and third cam drivers being spaced inwardly from said first cam drivers;
said first pair of cam drivers each having on one edge a cam surface;
said second pair of cam drivers each having a cam surface;
said third pair of cam drivers each having on one edge a cam surface;
a slideable finger rack on said lower die having a pair of upwardly opening lower fingers with recesses for receiving tubes;
a cylinder on said lower die attached to said finger rack for moving said rack from a loading station where a tube is gravity fed into a finger recess and for then moving said rack to a work station where the ends of the tube are cut and then for moving the cut tube to an exit station where the tube is discharged from the die set;
said work station having a pair of laterally moveable cutter holders and cutters which are moveable into and out of engagement with the ends of the tube;
said cutter holders also being movable in a transverse forward direction and in a transverse rearward direction relative to the tube;
each of said movable cutter holders having first, second and third cam surfaces thereon which are engageable respectively by the cam surfaces of said first, second and third cam drivers during the downward stroke of said upper die;
the cam surfaces of said first drivers when said upper die is moving through a downward stroke, engaging the first cam surfaces on said cutter holders and thereby moving said cutter holders towards the ends of the tube at the work station where said cutters enter the ends of the tube;
said second drivers during the continuing of the downward stroke of said upper die engaging the second cam surfaces of said cutter holders to drive said holders in a transverse forward direction to cut from top to bottom and to thereby form one side of the ends of the tube;
said third drivers during the continuing of the downward stroke of said upper die thereafter engaging the third cam surfaces of said cutter holders to drive said holders in a transverse rearward direction to cut from top to bottom and to thereby form the other side of the ends of the tube; and
said second drivers during the upward stroke of said upper die thereafter reengaging the second cam surfaces of said cutter holders to drive said holders in a transverse forward direction without cutting the tube until said second drivers clear the second cam surfaces of said cutter holders.

36. The triple action cam die set as set forth in claim 35, wherein means are provided for centering said cutter holders before the start of the next downward stroke of said upper die.

37. The triple action cam die set as set forth in claim 35, wherein an air switch is mounted on said lower die; and an actuator is carried by said upper die which is engageable with said air switch during said upward stroke for signaling said cylinder to reverse the movement of said upper die.

38. The triple action cam die set as set forth in claim 37, wherein said cylinder and said air switch are part of a pneumatic circuit which includes flow control valves mounted in said cylinder on opposite sides of the piston provided therein; an air valve connected to said flow control valves for directing air from one end of said cylinder to the other end; said air switch when operated by said actuator signaling said air valve to reverse the flow of air into said cylinder.

39. The triple action cam die set as set forth in claim 38, wherein said pneumatic circuit further includes a pressure regulator for determining the pressure in said pneumatic circuit.

40. The triple action cam die set as set forth in claim 38, wherein said pneumatic circuit further includes a filter, a regulator and a lubricator for directing the air from an outside source to said air valve and then to one or the other end of said cylinder through a corresponding flow control valve.

41. The triple action cam die set as set forth in claim 35, wherein each of said first cam drivers has a height greater than the heights of said second and third cam drivers.

42. The triple action cam die set as set forth in claim 41, wherein each of said second cam drivers has a height greater than the height of said third cam driver.

43. The triple action cam die set as set forth in claim 35, wherein each of said first cam drivers has a downwardly facing cam surface.

44. The triple action cam die set as set forth in claim 35, wherein said first cam drivers have a downwardly inclined abutment surfaces; positive return brackets mounted on said cutter holders; said brackets having abutment surfaces engageable with the abutment surfaces on said first cam drivers to provide a fail safe system to prevent damage to the die set.

45. The triple action cam die set as set forth in claim 35, wherein the cam surfaces provided on said second cam drivers are each of S-shape configuration.

46. The triple action cam die set as set forth in claim 35, wherein the cam surfaces on each of said third cam drivers has a downwardly facing flat surface at one corner thereof.

47. The triple action cam die set as set forth in claim 35, wherein said finger rack is provided with a pair of cavities in which said lower fingers are located.

48. The triple action cam die set as set forth in claim 47, wherein said fingers are biased for limited vertical movement by springs located in the cavities of said rack and said lower fingers.

49. The triple action cam die set as set forth in claim 47, wherein a support is mounted on said lower die; a pair of upper fingers are carried by said support; said upper fingers having downwardly facing tube receiving recesses which cooperate with corresponding recesses provided in said lower fingers.

50. The triple action cam die set as set forth in claim 49, wherein said upper fingers are spring biased for limited vertical movement.

51. The triple action cam die set as set forth in claim 35, wherein a downwardly inclined tube feeder is mounted on said lower die above said cylinder and one of said cutter holders, said feeder having an entrance at the top and an exit at the bottom of the feeder; said feeder exit being located above one of the lower fingers at said loading station.

52. The triple action cam die set as set forth in claim 51, wherein said rack on the upper surface thereof is provided with a tube engaging pusher that moves with said rack; said rack when moved by said cylinder in one direction moves said pusher underneath the exit of said feeder resulting in the tube moving from the loading station to the work station, with said pusher extending across the exit of said feeder to prevent tubes from exiting said feeder into said loading station.

53. The triple action cam die set as set forth in claim 52, wherein while work is being performed on the ends of the tube at said work station, said cylinder is energized to move said rack in the opposite direction to return said pusher and said rack to their original position thereby opening the exit at the bottom of said feeder, resulting in another tube from the exit of said feeder being gravity fed into the underlying lower finger at said loading station, said rack and pusher then being moved by said cylinder in said one direction where said pusher is moved underneath the exit of said feeder, the tube at said loading station is moved to the work station and the tube at the work station is simultaneously released by one of said upper fingers and exits the die set at the exit station.

54. The triple action cam die set as set forth in claim 53, wherein a chute is provided at the exit station for receiving finished tubes.

55. The triple action cam die set as set forth in claim 54, wherein said chute is divided into two longitudinally spaced apart sections which are mounted on the lower die in order to receive the ends of the tubes.

56. The triple action cam die set as set forth in claim 51, wherein said feeder is provided with a downwardly inclined surface which generally spans said lower die; said feeder being spaced above said cylinder.

57. The triple action cam die set as set forth in claim 35, wherein a punch is carried by said upper die at said work station to place an indentation in one end of a tube which forms an identification mark during the downward stroke of said upper die.

58. The triple action cam die set as set forth in claim 35, wherein said lower die is provided with a pair of support elements for cradling the tube at said work station; and said upper die is provided with a pair of clamps opposite the support elements on the lower die for clamping the opposite surfaces of the tube in a stationary position as the ends of the tube are being cut at the work station.

59. The triple action cam die set as set forth in claim 58, wherein said clamps are resiliently biased to hold said clamps against the tube.

60. The triple action cam die set as set forth in claim 35, wherein said lower die is provided at each side thereof with a pair of upwardly extending stop blocks for limiting the downward stroke of said upper die.

61. The triple action cam die set as set forth in claim 35, wherein said upper die is provided at opposite sides with a pair of guide posts, each post being fixed on one end to said upper die and on the other end to a bearing retainer;
said lower die having upstanding guide bushings; and
said bearing retainers being received in said guide bushings during the downward stroke of said upper die.

62. The die set as set forth in claim 35, wherein said lower die is provided with a pair of support elements for cradling the tube at said work station; and said upper die is provided with a pair of clamps opposite the support elements on the lower die for clamping the opposite surfaces of the tube in a stationary position as the tube is being cut at the work station.

63. The die set as set forth in claim 62, wherein said clamps are resiliently biased to hold said clamps against the tube.

64. A die set comprising:
an upper die having a downward stroke and an upward stroke;
a lower die cooperating with said upper die;
said upper die having a longitudinal axis and a transverse axis perpendicular thereto;
pairs of first, second and third cam drivers depending from said upper die and extending toward said lower die;
one of each of said first, second and third cam drivers being located at one side of said transverse axis and the other of each of said first, second and third cam drivers being located on the other side of said transverse axis;
said first cam drivers being spaced apart and intersecting said longitudinal axis;
said one second and third cam drivers and said other second and third cam drivers being spaced transversely apart on opposite sides of said longitudinal axis;
said second and third cam drivers being spaced inwardly from said first cam drivers;
said first pair of cam drivers each having on one edge a cam surface;
said second pair of cam drivers each having a cam surface;
said third pair of cam drivers each having on one edge a cam surface;
a work station in said lower die for receiving a tube;
a pair of laterally moveable cutter holders and cutters at said work station which are moveable relative to the ends of the tube;
said cutter holders each movable in a transverse forward direction and in a transverse rearward direction relative to the ends of the tube;
each of said movable cutter holders having first, second and third cam surfaces thereon which are engageable respectively by said first, second and third cam drivers during the downward stroke of said upper die;
the cam surfaces of said first cam drivers when said upper die is moving through a downward stroke, engaging the first cam surfaces on said cutter holders and thereby moving said cutter holders towards the ends of the tube at the work station where said cutters enter the ends of the tube;
said second cam drivers during the continuing of the downward stroke of said upper die engaging the second cam surfaces of said cutter holders to drive holders in a transverse forward direction to cut from top to bottom and to thereby form one side of the ends of the tube;

said third drivers during the continuing of the downward stroke of said upper die thereafter engaging the third cam surfaces of said cutter holders to drive said holders in a transverse rearward direction to cut from top to bottom and to thereby form the other side of the ends of the tube; and said second drivers during the upward stroke of said upper die thereafter reengaging the second cam surfaces of said cutter holders to drive said holders in a transverse forward direction without cutting the tube until said second cam drivers clear the second cam surfaces of said cutter holders.

65. The die set as set forth in claim 64, wherein means are provided for centering said cutter holders before the start of the next downward stroke of said upper die.

66. The die set as set forth in claim 64, wherein each of said first cam drivers has a height greater than the height of said second and third cam drivers.

67. The die set as set forth in claim 66, wherein each of said second cam drivers has a height greater than the heights of said third cam driver.

68. The die set as set forth in claim 64, wherein each of said first cam drivers has a downwardly facing cam surface.

69. The die set as set forth in claim 64, wherein said first cam drivers have downwardly inclined abutment surfaces; positive return brackets mounted on each said cutter holder; said brackets having abutment surfaces engageable with the abutment surfaces on said first cam drivers to provide a fail safe system to prevent damage to the die set.

70. The die set as set forth in claim 64, wherein the cam surfaces provided on said second cam drivers are each of S-shape configuration.

71. The die set as set forth in claim 64, wherein the cam surfaces provided on said third cam drivers have downwardly facing flat surfaces at one corner thereof.

72. The die set as set forth in claim 64, wherein a punch is carried by said upper die at said work station to place an indentation in one end of a tube which forms an identification mark during the downward stroke of said upper die.

73. The die set as set forth in claim 64, wherein said lower die is provided with a pair of support elements for cradling the tube at said work station; and said upper die is provided with a pair of clamps opposite the support elements on the lower die for clamping the opposite surfaces of the tube in a stationary position as the ends of the tube are being cut at said work station.

74. The die set as set forth in claim 73, wherein said clamps are resiliently biased to said clamps against the tube.

75. The die set as set forth in claim 64, wherein said lower die is provided at each side thereof with a pair of upwardly extending stop blocks for limiting the downward stroke of said upper die.

76. The die set as set forth in claim 64, wherein said upper die is provided at opposite sides with a pair of guide posts, each post being fixed on one end to said upper die and on the other end to a bearing retainer;

said lower die having upstanding guide bushings;

said bearing retainers being received in said guide bushings during the downward stroke of said upper die.

* * * * *